(12) United States Patent
Hikosaka et al.

(10) Patent No.: US 8,063,301 B2
(45) Date of Patent: Nov. 22, 2011

(54) PHOTOVOLTAIC MODULE

(75) Inventors: Masaru Hikosaka, Izumisano (JP); Hiroyuki Oda, Sakai (JP); Shingo Okamoto, Toyonaka (JP)

(73) Assignee: Sanyo Electric Co., Ltd., Moriguchi-shi (JP)

( * ) Notice: Subject to any disclaimer, the term of this patent is extended or adjusted under 35 U.S.C. 154(b) by 605 days.

(21) Appl. No.: 11/392,865

(22) Filed: Mar. 30, 2006

(65) Prior Publication Data

US 2006/0219291 A1 Oct. 5, 2006

(30) Foreign Application Priority Data

Mar. 31, 2005 (JP) ................................. 2005-103274
Jun. 17, 2005 (JP) ................................. 2005-178253

(51) Int. Cl.
*H02N 6/00* (2006.01)
(52) U.S. Cl. ......... 136/251; 136/243; 136/244; 136/245
(58) Field of Classification Search .................. 136/243, 136/244, 251
See application file for complete search history.

(56) References Cited

U.S. PATENT DOCUMENTS

| | | | | |
|---|---|---|---|---|
| 4,241,493 A | * | 12/1980 | Andrulitis et al. ............... | 438/67 |
| 4,392,009 A | * | 7/1983 | Napoli ............................ | 136/251 |
| 5,951,785 A | * | 9/1999 | Uchihashi et al. ............. | 136/251 |
| 6,066,796 A | * | 5/2000 | Itoyama et al. ................ | 136/251 |
| 6,380,025 B1 | | 4/2002 | Suzuki et al. | |
| 6,441,300 B2 | * | 8/2002 | Sannomiya et al. ........... | 136/251 |
| 6,462,265 B1 | * | 10/2002 | Sasaoka et al. ................ | 136/251 |
| 6,667,434 B2 | * | 12/2003 | Morizane et al. .............. | 136/251 |
| 7,297,867 B2 | * | 11/2007 | Nomura et al. ................ | 136/251 |
| 7,534,956 B2 | * | 5/2009 | Kataoka et al. ................ | 136/251 |
| 2002/0036010 A1 | * | 3/2002 | Yamawaki et al. ............ | 136/251 |
| 2002/0078991 A1 | * | 6/2002 | Nagao et al. ................... | 136/251 |
| 2004/0154655 A1 | * | 8/2004 | Tanaka ........................... | 136/244 |

FOREIGN PATENT DOCUMENTS

| | | | |
|---|---|---|---|
| AU | 608701 | * | 10/1989 |
| FR | 2629945 | * | 10/1989 |
| JP | 61-81165 | * | 5/1986 |
| JP | 2-2850 | * | 1/1990 |

(Continued)

OTHER PUBLICATIONS

Chinese Office Action, Jul. 25, 2008, issued in CN 200610067104X.

(Continued)

*Primary Examiner* — Jennifer K. Michener
*Assistant Examiner* — Matthew Martin
(74) *Attorney, Agent, or Firm* — Edwards Wildman Palmer LLP

(57) ABSTRACT

A photovoltaic module which prevents enlargement of the dimensions of a photovoltaic submodule by reducing ineffective parts which do not contribute to power generation. The photovoltaic module includes a photovoltaic submodule including a plurality of solar cells interposed between two light-transmitting substrates through the intermediary of an encapsulant, and a connecting lead extending from an edge between the two light-transmitting substrates for outputting generated electric current, a terminal box 30 attached near to the edge of the photovoltaic submodule housing a connecting part between the connecting lead and a cable for outputting generated electric current to the outside, and an outer frame set around the outer circumference of the photovoltaic submodule. An opening 28 through which the connecting lead and the terminal box are inserted is provided to the outer frame at a position which receives at least the terminal box.

20 Claims, 22 Drawing Sheets

FOREIGN PATENT DOCUMENTS

| | | | |
|---|---|---|---|
| JP | 02-012878 | | 1/1990 |
| JP | H03-1549 | | 1/1991 |
| JP | 4-130457 | * | 11/1992 |
| JP | H04-130457 | | 11/1992 |
| JP | 10-256584 | * | 9/1998 |
| JP | 11-354822 | | 12/1999 |
| JP | 2000-277771 | | 10/2000 |
| JP | 2001-053325 | | 2/2001 |
| JP | 2001-060706 | | 3/2001 |
| JP | 2001-098856 | | 4/2001 |
| JP | 2001-339087 | * | 12/2001 |
| JP | 2002-164561 | * | 6/2002 |
| JP | 2003-158285 | | 5/2003 |

OTHER PUBLICATIONS

Extended European Search Report, mailed Jul. 19, 2006, 3 pages.*

Non-Final Office Action dated May 28, 2009, issued in U.S. Appl. No. 11/519,233.

Chinese Office Action dated Mar. 13, 2009 issued in CN 200610067104X.

Japanese Notification of Reasons for Refusal dated Jan. 26, 2010, issued in Japanese Patent Application No. 2005-103274.

Japanese Notification of Reasons for Refusal dated Feb. 2, 2010, issued in Japanese Patent Application No. 2005-178253.

* cited by examiner

PHOTOVOLTAIC MODULE

The priority applications Numbers JP2005-178253 and 103274 upon which this patent application is based are hereby incorporated by reference.

BACKGROUND OF THE INVENTION

1. Field of the Invention

The present invention relates to a photovoltaic module, and is particularly suitable for a photovoltaic module which receives light on both sides.

2. Description of the Related Art

Photovoltaic power generation which converts light energy into electric energy by utilizing the photoelectric conversion effect is widely used as a means to obtain clean energy, which contributes to the global environment. In line with the improvement of solar cells' photoelectric conversion efficiency, many photovoltaic power generation systems using photovoltaic modules are installed for residential use.

In a photovoltaic module provided with a solar cell which generates electricity utilizing sunlight, conductive materials to form a positive electrode and a negative electrode are disposed in the photovoltaic module in order to output electricity generated by the solar cell to the outside. Edges of the conductive materials are taken out of the photovoltaic module as connecting terminals to which a cable for outputting electric current to the outside is connected, thereby extracting electric current.

The connecting terminals are provided by protruding the conductive materials from an edge of the photovoltaic module, or by exposing the conductive materials by way of a through-hole formed on a cover material of the photovoltaic module.

Connecting parts between the connecting terminals and the cable are stored in a housing called a terminal box for the purpose of protecting the connecting parts or preventing leakage of electricity. Usually, the terminal box is attached in the final process because the terminal box is obstructive during the production process. The terminal box is fixed by an adhesive or is screwed to an outer frame at the opposite side of a light-receiving surface of the photovoltaic module in order to reduce the weight load on the conductive materials, connecting terminals or connecting parts, and to avoid looseness in them by vibration or metal fatigue.

FIG. 27 and FIG. 28 are a cross-sectional view and a plan view respectively of a relevant part of a conventional photovoltaic module. As illustrated in FIG. 27 and FIG. 28, the photovoltaic module 1000 comprises a board-shaped photovoltaic submodule (photovoltaic panel) 50 including a plurality of solar cells 51 and an outer frame 60 made of aluminum for example set around the outer circumference of the photovoltaic submodule 50 through the intermediary of a sealing material 56. The photovoltaic submodule 50 has a plurality of solar cells 51 interposed between a light-receiving (front surface) side light-transmitting insulative substrate 52 made of low iron tempered glass for example and a rear surface side weatherproof substrate 53. A sealing resin 54 such as ethylene vinyl acetate (EVA) fills the inner gap.

The outer frame 60 is made by extruding aluminum. A fitting part 62 which is channel-shaped in a cross section and which pinches the photovoltaic submodule 50 is included in the upper part of a main body 61. The main body 61 is hollow inside to save the weight as well as relatively thick-walled and robust. A terminal box 70 is adhered and fixed to the rear surface side substrate 53, with one end of the terminal box 70 abutting on the inner side of the outer frame 60. If needed, the terminal box 70 is screwed to the outer frame 60.

Attachment of the terminal box 70 is not problematic to a photovoltaic module which receives light on one side, because the terminal box sits at the back of the solar cell, thereby not preventing receipt of light.

When the terminal box is used for a photovoltaic module which receives light on both sides, however, the terminal box reduces power generated by elements in parts of the solar cells 51 covered with the terminal box as illustrated in FIG. 27. This is because a large part of the terminal box is protruding to the power generation part. In order not to cover the solar cell with the terminal box 70, ineffective parts which do not contribute to power generation need to be increased by enlarging the substrates 52 and 53, which also enlarges the photovoltaic module.

Additionally, a connecting tub 55 connected to the terminal box 70 for extracting electricity is subject to damage because it is interposed between the substrate 53 and the outer frame 60. The connecting tub 55 has an insulating coating on its surface since it contacts the outer frame 60 made of metal. Damage to the insulating coating of the connecting tub 55 could lead to an insulation failure. The insulating coating thus needs to be thick to prevent an insulation failure in case of damage, which increases the manufacturing cost of the connecting tub 55.

A photovoltaic module which receives light on both sides is suggested in which the degree of freedom in formation of the photovoltaic module is high because at the time the terminal box is attached, the front and the back of the photovoltaic module are not identified (e.g. Japanese unexamined patent publication No. 2003-158285). The publication discloses a method for manufacturing a photovoltaic module in which a plurality of solar cells which receive light on both sides are disposed between a plurality of light-transmitting cover materials, an electrode terminal for outputting generated current is protruding from an edge between the plurality of the light-transmitting cover materials, and a terminal box housing a connecting part between the electrode terminal and a cable for outputting generated current to the outside is provided at the edge. The terminal box is attached so that its outward form is in parallel with the front and the rear surfaces of the photovoltaic module, and is nearly symmetric with respect to a center face located in the center. The attached terminal box is housed in a hollow of a frame to form the photovoltaic module.

SUMMARY OF THE INVENTION

The above-identified photovoltaic module disclosed in the Japanese unexamined patent publication No. 2003-158285 eliminates ineffective parts irrelevant to power generation since the terminal box does not cover the solar cell. In order to attach the terminal box to an edge of the photovoltaic module, however, the photovoltaic module of the Japanese unexamined patent publication No. 2003-158285 needs a supporting leg formed roughly in a C FIGURE provided to the terminal box, thereby complexifying the shape of the terminal box. Additionally, various supporting legs are needed according to changes in the thickness of the photovoltaic module, and the invention of the Japanese unexamined patent publication No. 2003-158285 may not be applicable to photovoltaic modules with different shapes.

The present invention has an objective to provide a photovoltaic module which does not need a terminal box of a particular shape, and which reduces ineffective parts which do not contribute to power generation, thereby preventing enlargement of the solar cell penal.

The photovoltaic module of the present invention is characterized by comprising: a photovoltaic submodule including a plurality of solar cells interposed between a light-transmitting first member and a second member through the intermediary of an encapsulant, and a connecting lead extending from an edge between the light-transmitting first member and the second member for outputting generated electric current; a terminal box attached near to the edge of the photovoltaic submodule housing a connecting part between the connecting lead and a cable for outputting generated electric current to the outside; and an outer frame set around the outer circumference of the photovoltaic submodule. An opening through which the terminal box is inserted is provided to the outer frame at a position which receives at least the terminal box.

As described above, less part of the terminal box is protruding to the power generation part in the present invention. This is because the terminal box can be inserted through the opening into the main body which is hollow inside of the outer frame of the photovoltaic module. As a result, the photovoltaic module's conversion efficiency can be enhanced without enlarging the whole dimensions of the photovoltaic module. Further, the connecting lead is not interposed between the light-transmitting member and the outer frame because the connecting lead can be taken out of the outer frame through the opening. Therefore, it is possible to prevent damage to the connecting lead as well as an insulation failure without excessively thickening insulating coating of the connecting lead.

A masking part may be provided to the first member at a position facing toward the terminal box.

The masking part makes the adhesive used for attaching the terminal box to the second member invisible from the first member side (light-receiving side). The terminal box is made invisible too from the light-receiving side. This keeps the good appearance of the photovoltaic module as well as suppresses degradation of the terminal box by blocking light which transmits a member at the light-receiving side from irradiating the terminal box.

The photovoltaic module of the present invention is characterized by comprising: a photovoltaic submodule including a plurality of solar cells interposed between a light-transmitting first member and a second member through the intermediary of an encapsulant, and a connecting lead extending from an edge between the light-transmitting first member and the second member for outputting generated electric current; an outer frame having a fitting part set around the outer circumference of the photovoltaic submodule; and a terminal box attached to the second member near to the edge of the photovoltaic submodule housing a connecting part between the connecting lead and a cable for outputting generated electric current to the outside. An opening through which the terminal box is inserted is provided to the outer frame at a position which receives at least the terminal box. The second member is disposed so that the first member protrudes over the second member toward the outside at a side from where the connecting lead is extended out, and the connecting lead is guided through a space between the second member and the fitting part to be introduced into the terminal box inserted into the opening.

Additionally, it is preferable to make an outer dimension of the second member smaller than an outer dimension of the first member. It is also preferable to attach the terminal box to a narrow side of the photovoltaic submodule, and make a dimension of a wide side of the second member from 98.0% or more to 98.5% or less of that of the first member.

The above described structure reduces or eliminates the space for taking out the connecting lead between an outer frame and a photovoltaic submodule, which reduces the dimensions of the photovoltaic module by just the reduced or eliminated width of the space, leading to improvement of the rate of area which contributes to produce electricity in the installation area of the photovoltaic module.

The encapsulant is formed by a sheet of ethylene vinyl acetate which is smaller than the first member and larger than the second member.

Further, the photovoltaic module of the present invention is characterized by comprising: a photovoltaic submodule including a plurality of solar cells interposed between a light-transmitting first member and a second member through the intermediary of an encapsulant, and a connecting lead extending from an edge between the light-transmitting first member and the second member for outputting generated electric current; an outer frame having a fitting part set around the outer circumference of the photovoltaic submodule; and a terminal box made of resin attached to the second member near to the edge of the photovoltaic submodule housing a connecting part between the connecting lead and a cable for outputting generated electric current to the outside provided with an upright part abutting on an inner wall of the fitting part. An opening through which the terminal box is inserted is provided to the outer frame at a position which receives at least the terminal box, and the connecting lead is guided through a space between the upright part of the terminal box and an edge of the photovoltaic submodule to be introduced into the terminal box.

With the above-described structure, the connecting lead does not contact the outer frame directly by the presence of the upright part of the terminal box made of resin, thereby securing sufficient insulation even when using the connecting lead having a thin insulating coating.

It is preferable to dispose the second member so that the first member protrudes over the second member toward the outside at a side from where the connecting lead is extended out, make an edge of the first member abutting on the upright part of the terminal box, and guide the connecting lead through a space between the second member and the upright part.

It is also possible to dispose the second member so that the first member protrudes over the second member toward the outside at a side from where the connecting lead is extended out, make an edge of the first member positioned near to or abutting on an inner wall at a side surface of the fitting part, and guide the connecting lead through a space between the second member and the upright part.

Furthermore, an outer dimension of the second member is preferably made smaller than an outer dimension of the first member.

By disposing the second member so that the first member protrudes over the second member toward the outside at a side from where the connecting lead is extended out, making an edge of the first member abut on the upright part of the terminal box, and guiding the connecting lead through a space between the second member and the upright part as described above, the space for taking out the connecting lead between the outer frame and the photovoltaic submodule can be eliminated, which reduces the dimensions of the photovoltaic module by just the eliminated width of the space, leading to improvement of area efficiency in the installation area of the photovoltaic module.

The second member is made of a light-transmitting material, and the photovoltaic submodule receives light on both sides.

The foregoing and other objects, features, aspects and advantages of the present invention will become more apparent from the following detailed description of the present invention when reviewed in conjunction with the accompanying drawings.

DETAILED DESCRIPTION OF THE PREFERRED EMBODIMENTS

Embodiments of the present invention will be described in detail with reference to the drawings. The same reference numbers are given to components which are identical with or equivalent to each other, and their descriptions will be omitted to avoid repetition.

Figure 1:
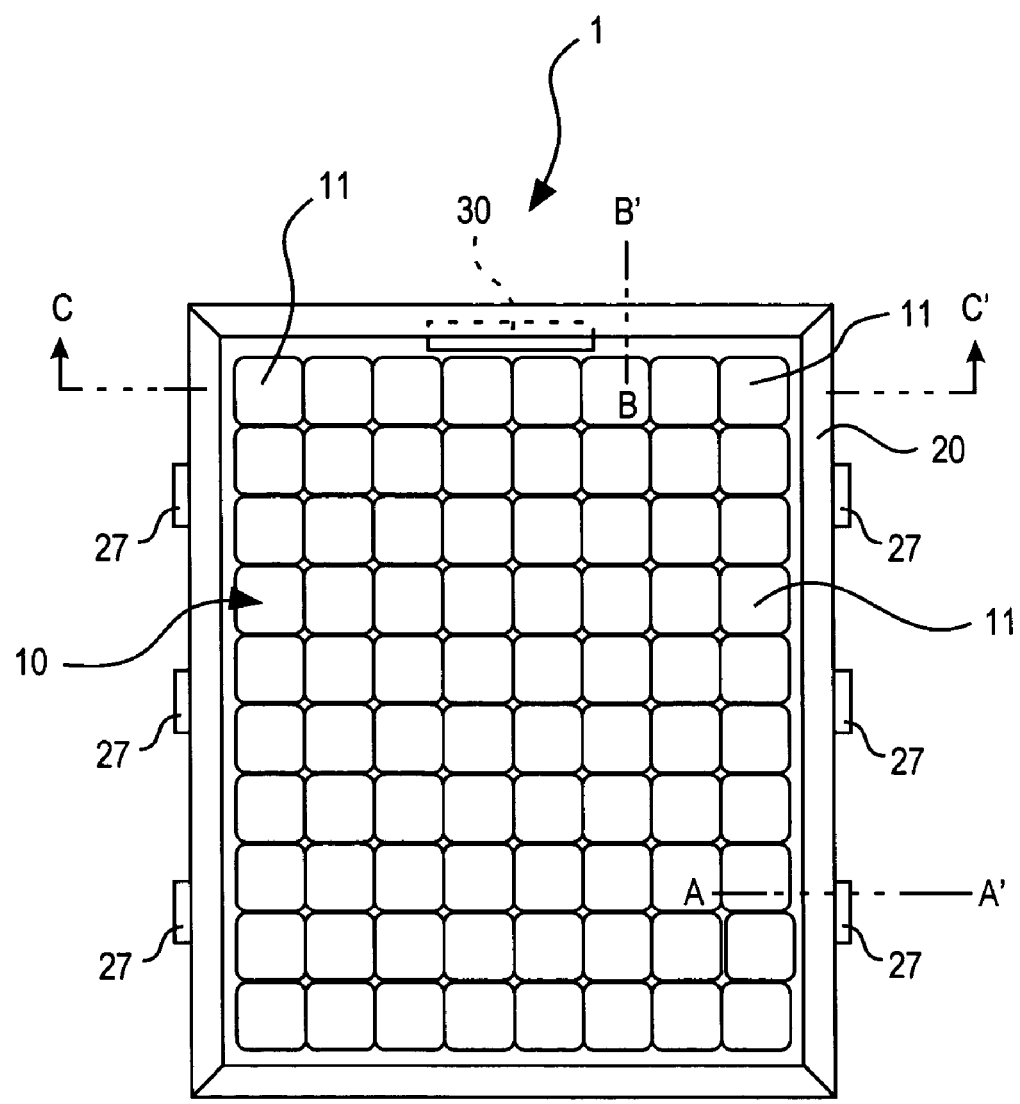
FIG. 1 is a plan view illustrating a photovoltaic module according to a first embodiment of the present invention.
Figure 2:
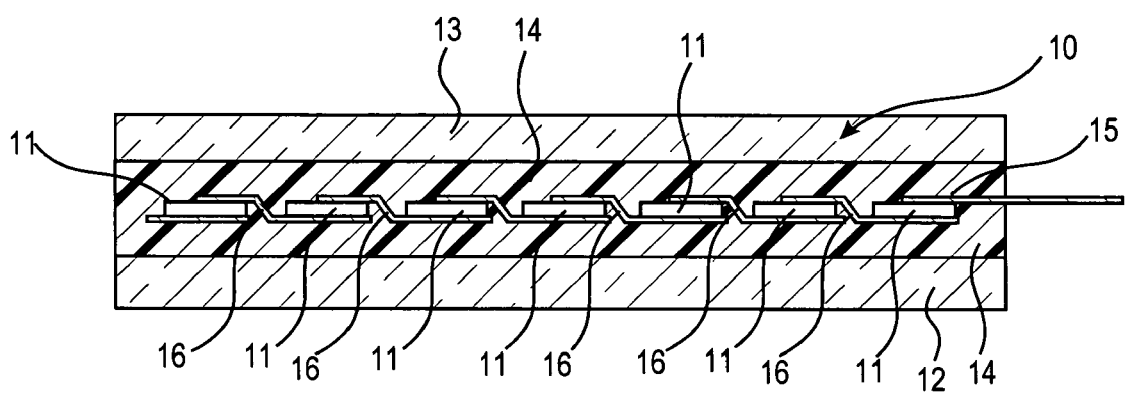
FIG. 2 is a cross-sectional view of a photovoltaic submodule used for the photovoltaic module according to the first embodiment of the present invention.
Figure 3:
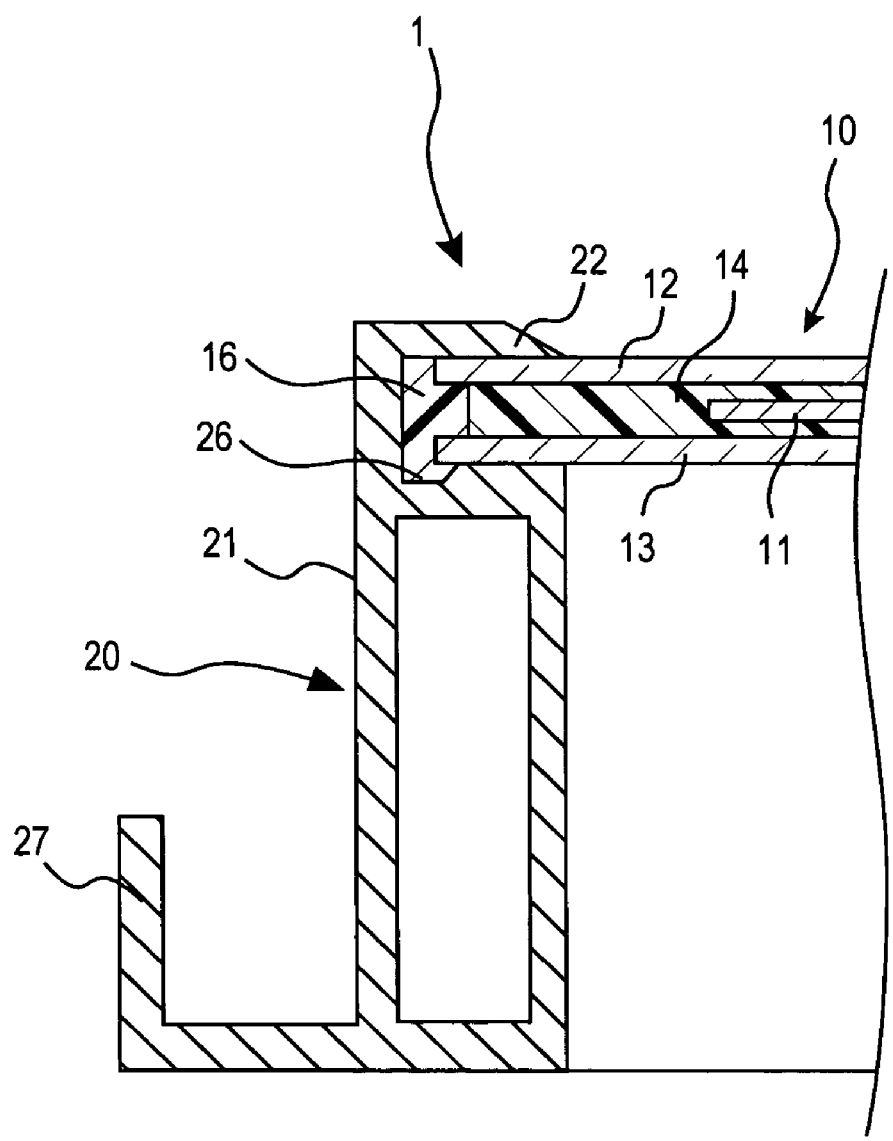
FIG. 3 is a cross-sectional view taken along the line A-A' of FIG. 1.
Figure 4:
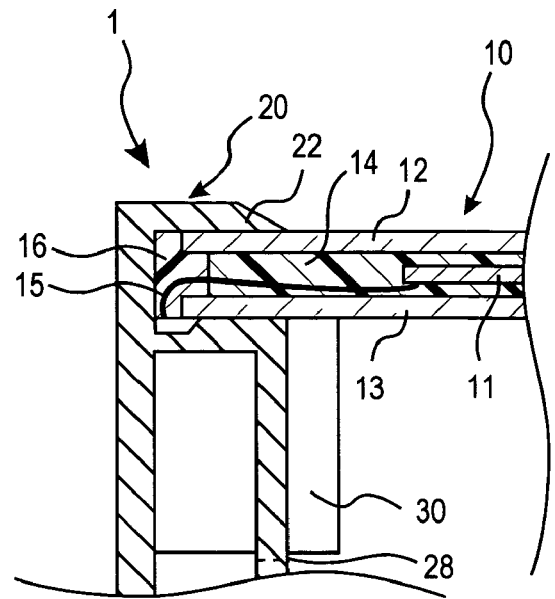
FIG. 4 is a cross-sectional view taken along the line B-B' of FIG. 1.
Figure 5:
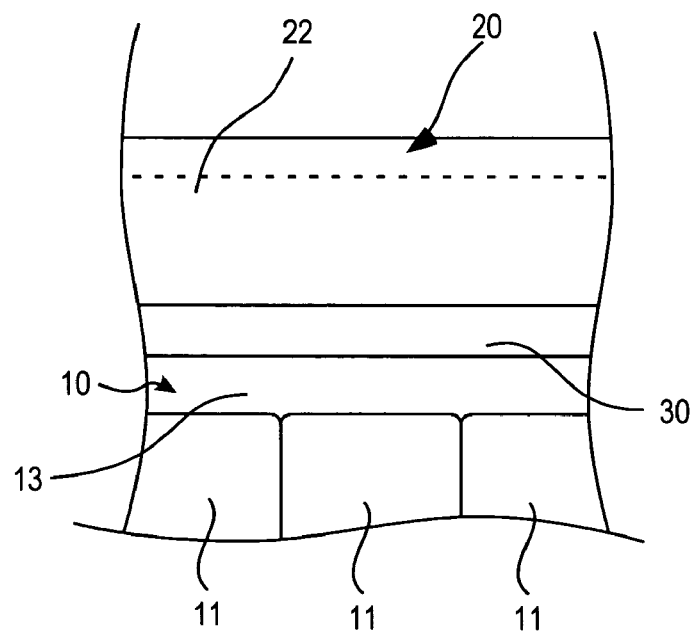
FIG. 5 is a plan view of a relevant part of the photovoltaic module according to the first embodiment of the present invention.
Figure 6:
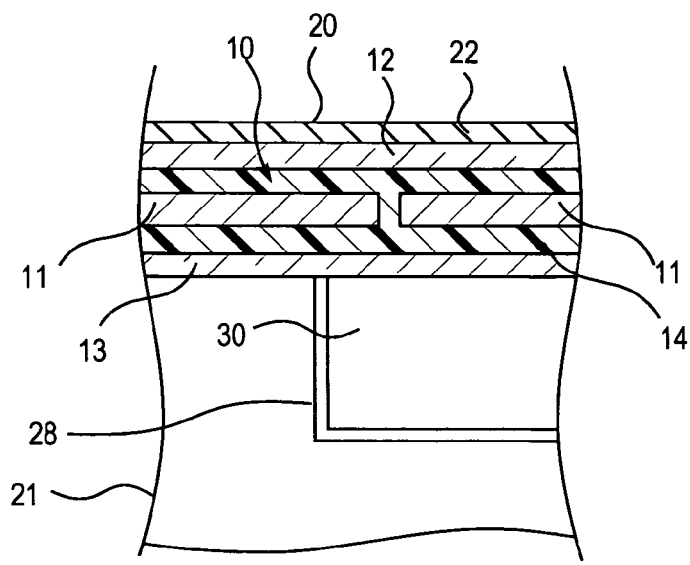
FIG. 6 is a cross-sectional view of a relevant part of the photovoltaic module according to the first embodiment of the present invention taken along the line C-C' of FIG. 1.

FIG. 1 is a plan view illustrating a photovoltaic module according to a first embodiment of the present invention; FIG. 2 is a cross-sectional view of a photovoltaic submodule used for the photovoltaic module according to the first embodiment of the present invention; FIG. 3 is a cross-sectional view taken along the line A-A' of FIG. 1; FIG. 4 is a cross-sectional view taken along the line B-B' of FIG. 1; FIG. 5 is a plan view of a relevant part of the photovoltaic module according to the first embodiment of the present invention; and FIG. 6 is a cross-sectional view of a relevant part of the photovoltaic module according to the first embodiment of the present invention taken along the line C-C' of FIG. 1.

As illustrated in FIG. 1, FIG. 2, FIG. 3 and FIG. 4, the photovoltaic module 1 of the present invention comprises; a rectangular-shaped photovoltaic submodule 10 which receives light on both sides including a plurality of solar cells 11 which also receive light on both sides; and an outer frame 20 made of metal such as aluminum or stainless set around the outer circumference of the photovoltaic submodule 10 through the intermediary of a sealing material 16. Although cross-sectional structures of the outer frame 20 of the photovoltaic module 1 are shown only by cross-sections taken along lines A-A' and B-B', cross-sectional structures at each of the four sides are basically identical.

The photovoltaic submodule 10 comprises, as illustrated in FIG. 2, a light-receiving (front surface) side light-transmitting insulative substrate 12 made of low iron tempered glass for example and a rear surface side light-transmitting insulative substrate 13 made of low iron tempered glass for example. A plurality of solar cells 11 are interposed between the substrates 12 and 13, and a transparent sealing resin 14 such as ethylene vinyl acetate (EVA) fills the inner gap. Adjacent solar cells 11, 11 are connected in series or parallel by inner leads 16 made of copper foil for example.

In the first embodiment, the light-receiving side light-transmitting insulative substrate 12 and the rear surface side light-transmitting insulative substrate 13 have the same dimensions. Each of the substrates 12 and 13 is made of low iron tempered glass with an outer dimension of 980 mm×1500 mm for example.

Various types of solar cells are available for the solar cell 11 such as crystalline-type, amorphous-type and the like. Recently, a solar cell which reduces loss of power generation at defective areas on its surface to realize high power generation has been in the spotlight. A substantially i-type amorphous silicon layer without dopant is interposed between a crystalline substrate and a p-type amorphous silicon layer, and between a crystalline substrate and an n-type amorphous silicon layer so as to improve interface characteristics. These solar cells 11 are connected in series or parallel to generate a specified output such as 200 W from the photovoltaic submodule 10 through a connecting lead 15.

Figure 7:
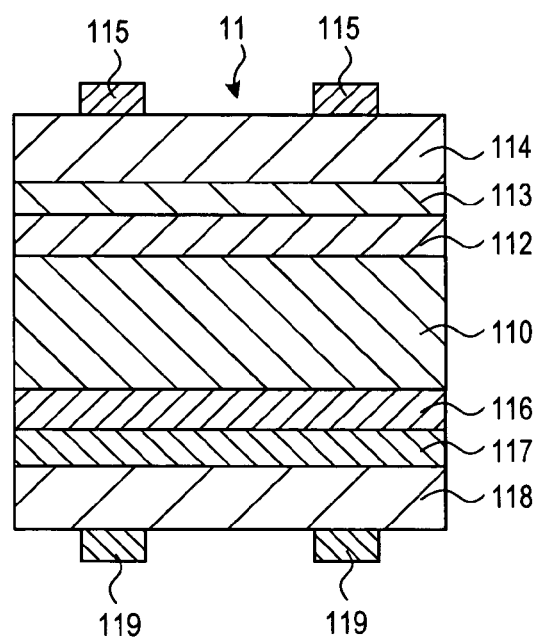
FIG. 7 is a schematic cross-sectional view illustrating a solar cell used for embodiments of the present invention.

The structure of the aforementioned solar cell 11 will be described with reference to FIG. 7. FIG. 7 is a schematic cross-sectional view illustrating a solar cell used for embodiments of the present invention. For an easier understanding of the structure of each layer, thin layers are enlarged in FIG. 7 regardless of the proportion according to an actual thickness of each layer.

As shown in FIG. 7, the solar cell 11 comprises an n-type single crystalline silicon (c-Si) substrate 110 with a (100) plane (hereinafter referred to as n-type single crystalline silicon substrate 110) having resistivity of about 1 Ω·cm, and a thickness of about 300 μm as a crystalline semiconductor substrate. There are pyramidal projections and depressions having a height of a few micro meters to a few tens of micro meters on a surface of the n-type single crystalline silicon substrate 110, although not shown. The projections and depressions are made for confining light. A substantially intrinsic i-type amorphous silicon (a-Si:H) layer 112 having a thickness of 3 nm to 250 nm is formed on the n-type single crystalline silicon substrate 110 by an RF plasma CVD method as a substantially intrinsic amorphous semiconductor thin film layer including hydrogen. In addition, a p-type amorphous silicon layer 113 having a thickness of about 5 nm is formed on the i-type amorphous silicon layer 112 as a doped amorphous semiconductor thin film layer including hydrogen.

In this embodiment, an Indium Tin Oxide (ITO) film 114 having a thickness of about 100 nm is formed on the p-type amorphous silicon layer 113 as a transparent conductive oxide film by a magnetron sputtering method. The ITO film 114 is made of indium oxide ($In_2O_3$) with the addition of tin oxide ($SnO_2$).

A comb-shaped collector electrode 115 made of silver paste is formed at a predetermined region on an upper surface of the ITO film 114. The collector electrode 115 consists of a bus bar portion and finger portions. Inner leads are connected to the bus bar portion.

A substantially intrinsic i-type amorphous silicon layer 116 with a thickness of about 5 nm is formed on a lower surface of the n-type single crystalline silicon substrate 110. An n-type amorphous silicon layer 117 with a thickness of about 20 nm is formed on a lower surface of the i-type amorphous silicon layer 116. Thus the so called Back Surface Field (BSF) structure is formed by laminating the i-type amorphous silicon layer 116 and the n-type amorphous silicon layer 117 in this order on the lower surface of the n-type single crystalline silicon substrate 110. In this embodiment, an ITO film 118 having a thickness of about 100 nm is formed by a magnetron sputtering method as a transparent conductive oxide film on the n-type amorphous silicon layer 117. The ITO film 118 is made of $In_2O_3$ with the addition of $SnO_2$.

A comb-shaped collector electrode 119 made of silver paste is formed at a predetermined region on the ITO film 118.

An example of manufacturing the aforementioned solar cell 11 will be described. The n-type single crystalline substrate 110 is cleaned and put into a vacuum chamber to be heated up to an appropriate temperature (200 degrees Celsius or less) so that water attaching to the front surface of the substrate can be removed to the utmost. Next, hydrogen gas is introduced and the substrate is exposed to plasma discharge to clean the surface thereof.

After that, silane ($SiH_4$) gas and hydrogen gas are introduced and the non-doped i-type amorphous silicon layer 112 is formed. Then $SiH_4$ gas, hydrogen gas and dopant gas of diborane gas ($B_2H_6$) are introduced and the p-type amorphous silicon layer 113 is formed to complete a p-n junction. An indium tin oxide layer is formed by sputtering method as the front surface side electrode 114. A silver electrode is formed by a screen-printing method which undergoes sintering to form the collector electrode 115.

The so-called BSF structure is formed by laminating the non-doped i-type amorphous silicon layer 116 and the n-type amorphous silicon layer 117 on the opposite side of the substrate 110. Next the rear surface side electrode layer 118 and the collector electrode 119 are formed in the same manner. The thin film layers are formed sequentially from the rear surface side (n-type side), or from the front surface side (p-type side).

The same applies to a solar cell using a p-type substrate in which a non-doped amorphous silicon layer, an n-type amorphous silicon layer, an indium tin oxide layer, and a silver collector electrode are formed on the front surface side while a non-doped amorphous silicon layer, a p-type amorphous silicon layer, and a rear surface side electrode layer are formed on the rear surface side.

A plurality of solar cells 11 formed as described above are aligned at predetermined intervals. Collector electrodes of neighboring solar cells 11, 11 are connected to each other in series or parallel by inner leads made of copper foil for example. A specified output such as 200 W is generated from the photovoltaic submodule 10 through a connecting lead 15 as illustrated in FIG. 2.

Figure 8:
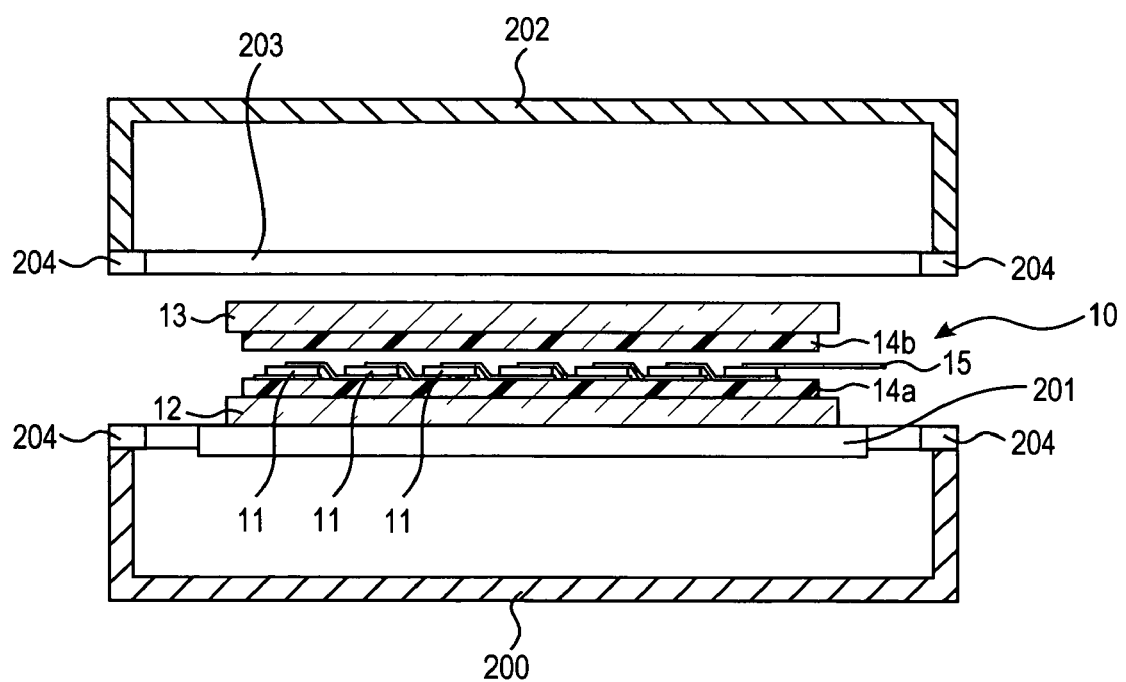
FIG. 8 is a schematic structural diagram of manufacturing equipment for manufacturing a photovoltaic submodule used for the present invention.

Next, a method for manufacturing the aforementioned photovoltaic submodule 10 will be described with reference to FIG. 8. FIG. 8 is a schematic structural diagram of manufacturing equipment for manufacturing the photovoltaic submodule 10. The equipment comprises a lower side chamber 200 and an upper side chamber 202 which will be coupled to the lower side chamber airtightly. A heating plate 201 is provided at an upper opening of the lower chamber 200 so that the heating plate 201 and the upper opening of the lower chamber 200 are nearly on the same plane. The upper chamber 202 includes a diaphragm 203 made of rubber provided at a side opposed to the opening of the lower side chamber 200. A gasket 204 is provided around the whole circumference of the lower side chamber 200 and the upper side chamber 202 in order to keep the air-tightness after the lower side chamber 200 and the upper side chamber 202 are coupled together. Additionally, a vacuum pump is connected to the lower side chamber 200 though not shown.

In order to manufacture the photovoltaic submodule 10, a light-receiving side light-transmitting insulative substrate 12, an EVA sheet 14a (encapsulant), a plurality of solar cells 11 connected by the inner leads 16 to each other, an EVA sheet 14b (encapsulant) and a rear surface side light-transmitting insulative substrate 13 are laminated in this order from the bottom on the heating plate 201 of the manufacturing equipment. The EVA sheets 14a and 14b are slightly smaller in size than the light-transmitting insulative substrates 12 and 13. In this embodiment, the EVA sheets of 970 mm×1485 mm are used. Additionally, the connecting lead 15 is attached to the photovoltaic submodule 10 to take out electricity generated by the solar cell 11.

After the components are laminated on the heating plate 201 as described above, the lower side chamber 200 and the upper side chamber 202 are coupled together. Then the lower side chamber 200 is evacuated by the vacuum pump which is not shown while the heating plate 201 is heated up to 170 degrees Celsius approximately. The diaphragm 203 is pressed against the photovoltaic submodule 10 placed on the heating plate 201 with this condition, so that the EVA sheets 14a and 14b are gelled to form the predetermined EVA layer 14. This makes the solar cell 11 placed between the front surface side light-transmitting insulative substrate 12 and the rear surface side light-transmitting insulative substrate 13 to be sealed within the EVA layer 14.

As illustrated in FIG. 1, FIG. 3 and FIG. 4, the photovoltaic submodule 10 manufactured as described above is set in and fixed to the fitting part 22 of the outer frame 20 by the use of the sealing material 16.

As illustrated in FIG. 3 and FIG. 4, the outer frame 20 includes the main body 21 which is hollow inside and the fitting part 22 which is channel-shaped in a cross section and which pinches the outer circumference of the photovoltaic submodule 10 in the upper part of the main body 21. A depressed part 26 for storing the sealing material 16 is provided to the fitting part 22. Out of the four sides of the main body 21, at least each of the two sides opposed to each other has a rim part 27 projecting outward from the bottom surface of the main body 21 and further extending upward.

In this embodiment, an opening 28 into which the terminal box 30 is inserted is provided to the main body 21 of the outer frame 20 as illustrated in FIG. 4 and FIG. 6. The terminal box 30 can be housed in the hollow of the main body 21 by way of the opening 28.

The connecting lead 15 having an insulating coating on its surface is extending from an edge of the photovoltaic submodule 10 to be taken out of the opening 28 of the main body 21 of the outer frame 20 into the hollow of the main body 21. Unlike the conventional photovoltaic module, the connecting lead 15 can be guided to the terminal part of the terminal box 30 without being interposed between the light-transmitting insulative substrate 13 and the fitting part 22 of the outer frame 20.

In this embodiment, less part of the terminal box 30 is protruding to the power generation part as illustrated in FIG. 5. This is because the terminal box 30 can be housed in the main body 21 which is hollow inside of the outer frame 20 of the photovoltaic module 1 by way of the opening 28. As a result, the photovoltaic module's conversion efficiency can be improved without enlarging the whole dimensions of the photovoltaic module 1.

Further, the connecting lead 15 is not interposed between the light-transmitting insulative substrate 13 and the fitting part 22 of the outer frame 20 because the connecting lead 15 can be taken out into the hollow of the outer frame 20 by the use of the opening 28. Therefore, it is possible to prevent damage to the connecting lead 15 as well as an insulation failure without excessively thickening insulating coating of the connecting lead 15.

Figure 9:
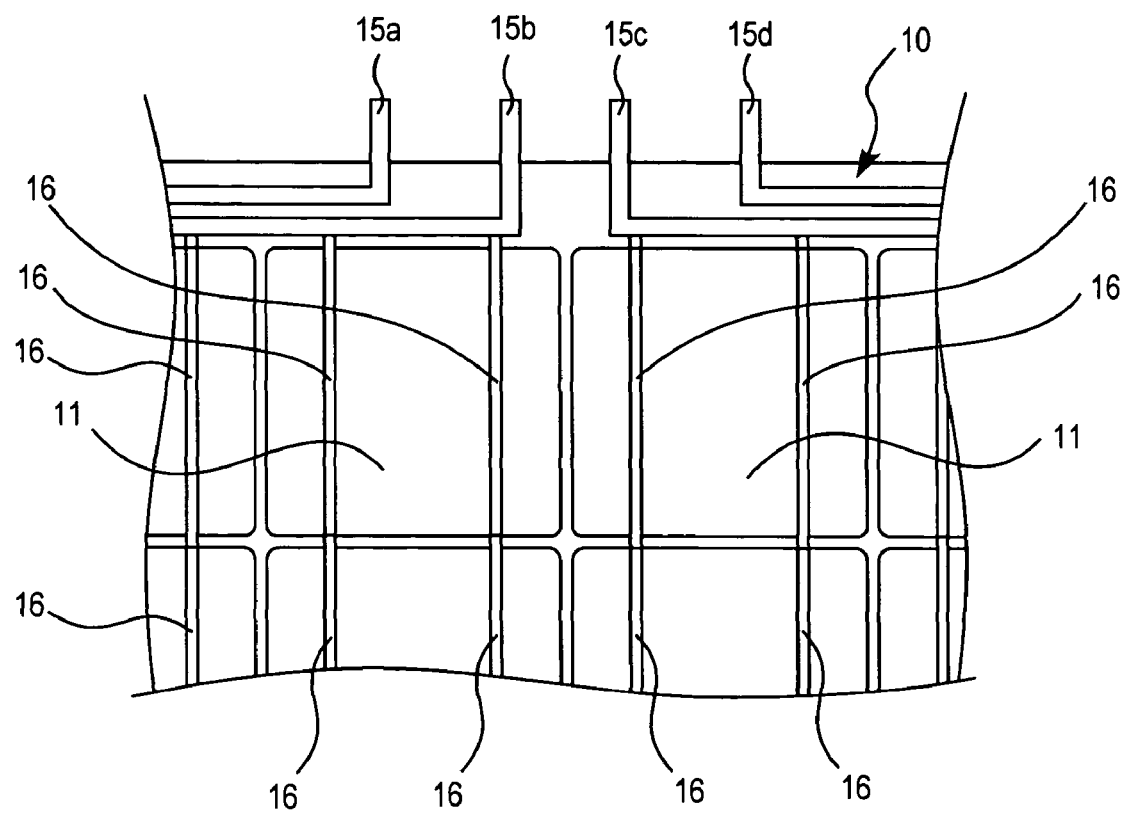
FIG. 9 is a plan view illustrating a connecting lead part of the photovoltaic submodule used for the present invention.
Figure 10:
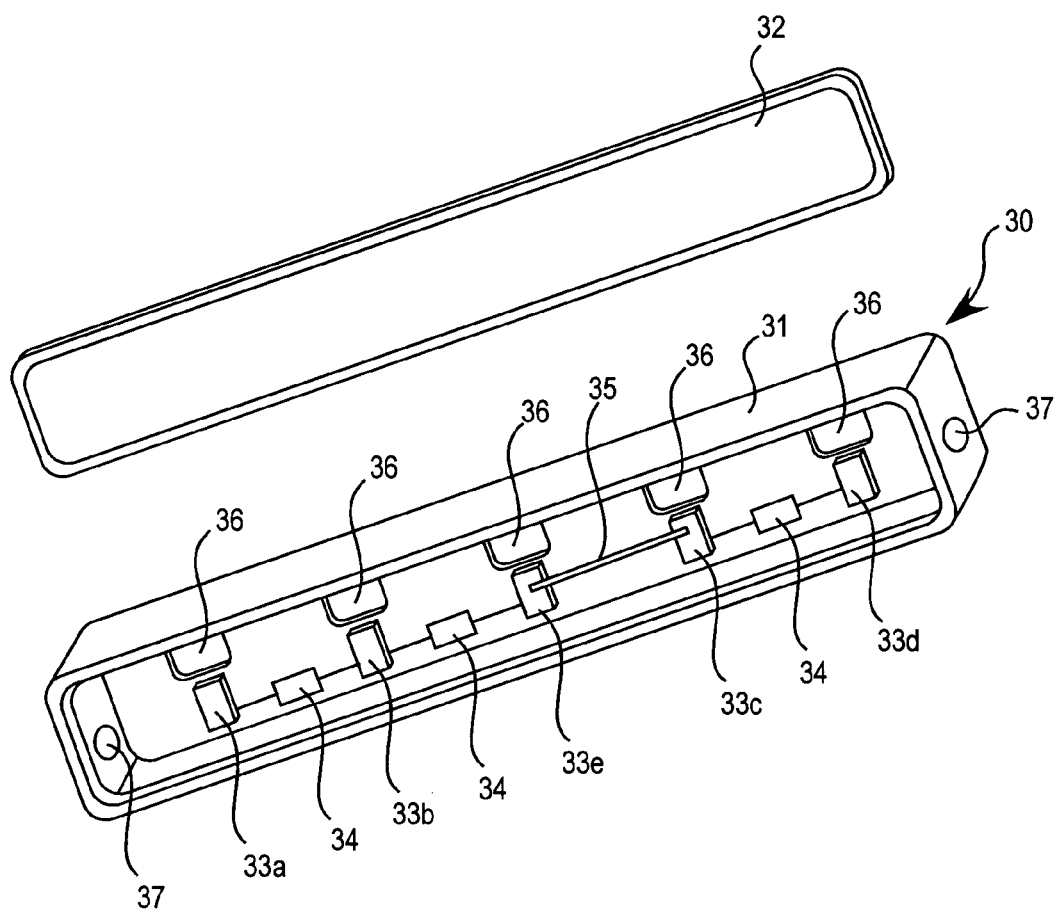
FIG. 10 is an exploded perspective view of a terminal box used for the first embodiment of the present invention.
Figure 11:
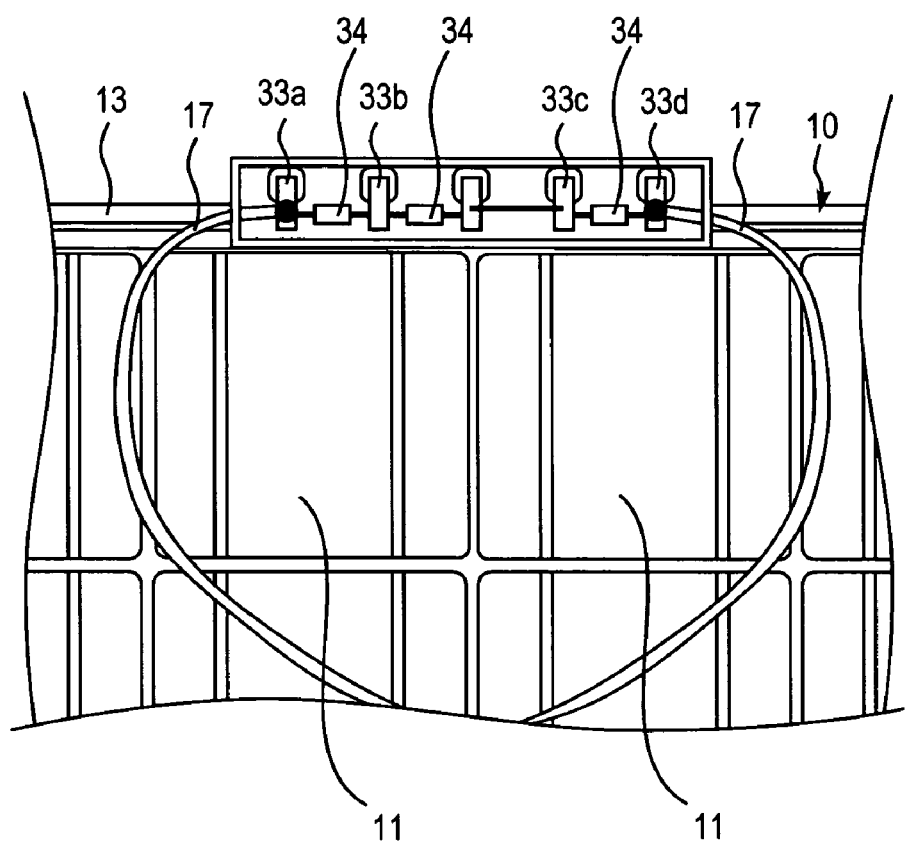
FIG. 11 is a plan view illustrating the terminal box attached to the photovoltaic submodule.

Next, one example of the terminal box 30 used in the above-described embodiment of the present invention will be described as referring to FIG. 9, FIG. 10 and FIG. 11. FIG. 9 is a plan view illustrating a connecting lead part of the photovoltaic submodule 10 used for the present invention; FIG. 10 is an exploded perspective view of a terminal box used for the first embodiment of the present invention; and FIG. 11 is a plan view illustrating the terminal box attached to the photovoltaic submodule.

As illustrated in FIG. 9, the photovoltaic submodule 10 of this embodiment includes four connecting leads 15a, 15b, 15c and 15d derived from an edge of a narrow side of the photovoltaic submodule. Each of the connecting leads has insulating coating. For example, the connecting lead 15a and the connecting lead 15d are derived from the edge of the photovoltaic submodule 10 as a negative terminal and a positive terminal respectively. Additionally, the connecting leads 15b and 15c to install bypass diodes are derived from the edge of the photovoltaic submodule 10. A plurality of solar cells 11 are connected in series to form a string, for example. The photovoltaic submodule 10 comprises six of such strings connected in series. The connecting leads 15b and 15c to install bypass diodes are connected to other strings than the strings to which the connecting leads 15a and 15d derived respectively as a negative terminal and a positive terminals are connected. Bypass diodes are connected among the connecting leads so that output power can be taken out of the photovoltaic module 1 even if output power from any one of the strings is decreased by shadow etc. For this reason, the connecting leads 15a, 15b, 15c and 15d are connected in series through bypass diodes in the terminal box 30.

As illustrated in FIG. 10, the terminal box 30 consists of a box-shaped main body 31 with one open face and a lid 32 to cover and seal the open face. The main body 31 and the lid 32 are formed by resin molding.

Terminal blocks 33a, 33b, 33c, 33d and 33e are provided inside the main body 31 of the terminal box 30 corresponding to the connecting leads. Inserting holes 36 into which the connecting leads are inserted are provided in the bottom of the main body 30 corresponding to the terminal blocks 33a, 33b, 33c, 33d and 33e. Inserting holes 37, 37 into which the cable is inserted are provided at both lateral sides of the main body 31.

In this embodiment, five terminal blocks are provided for four connecting leads. No connecting lead is connected to the terminal block 33e in this embodiment. Therefore, the terminal block 33e and the terminal block 33c are connected through a jumper wire. A bypass diode 34 is connected respectively between the terminal blocks 33a and 33b, the terminal blocks 33b and 33e, and the terminal blocks 33c and 33d.

In order to connect the terminal box 30 and the connecting leads 15a, 15b, 15c and 15d, the connecting leads 15a, 15b, 15c and 15d are inserted through the inserting holes 36 to be connected respectively to the terminal blocks 33a, 33b, 33c and 33d by soldering. The cable 17 inserted from the inserting hole 37 is fixed firmly to the terminal block 33a by crimping for example. Similarly, the cable 17 inserted from the inserting hole 37 is fixed firmly to the terminal block 33d by crimping for example. If necessary, a bushing may be attached to the inserting hole 37 to enhance waterproofness. Additionally, though not shown, a member to prevent the cable from slipping off may be provided to the terminal box 30 to enhance mechanical strength.

Thus the connecting leads 15a, 15b, 15c and 15d are connected in series by the use of the terminal box 30, and a cable 17 for a positive electrode and a cable 17 for a negative electrode are derived from the terminal box 30.

The terminal box 30 is fixed to the rear surface side light-transmitting insulative substrate 13 by an adhesive or the like so that part of the terminal box 30 is protruding from an edge of the narrow side of the rear surface side light-transmitting insulative substrate 13. The protruding part of the terminal box 30 is, as described above, inserted through the opening 28 of the outer frame 20 to be housed in the main body 21 which is hollow in side.

Figure 12:
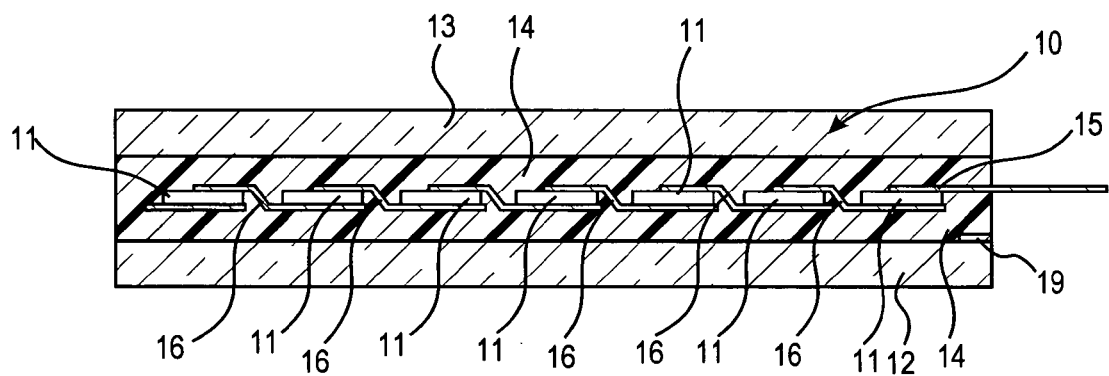
FIG. 12 is a cross-sectional view illustrating a photovoltaic submodule used for a second embodiment of the present invention.

Next, a second embodiment of the present invention will be described. FIG. 12 is a cross-sectional view illustrating a photovoltaic submodule used for a photovoltaic module of the second embodiment of the present invention; and FIG. 13 is a cross-sectional view taken along the line B-B' of FIG. 1.

In the second embodiment, the terminal box 30 is fixed to an edge of a narrow side of the photovoltaic module. In the second embodiment, a printed area 19 is provided as a masking part to the light-receiving side light-transmitting insulative substrate 12 at a position facing toward the terminal box 30 as illustrated in FIG. 13. The second embodiment is structured in the same way as the first embodiment except for the printed area 19 provided to the photovoltaic submodule 10.

Figure 13:
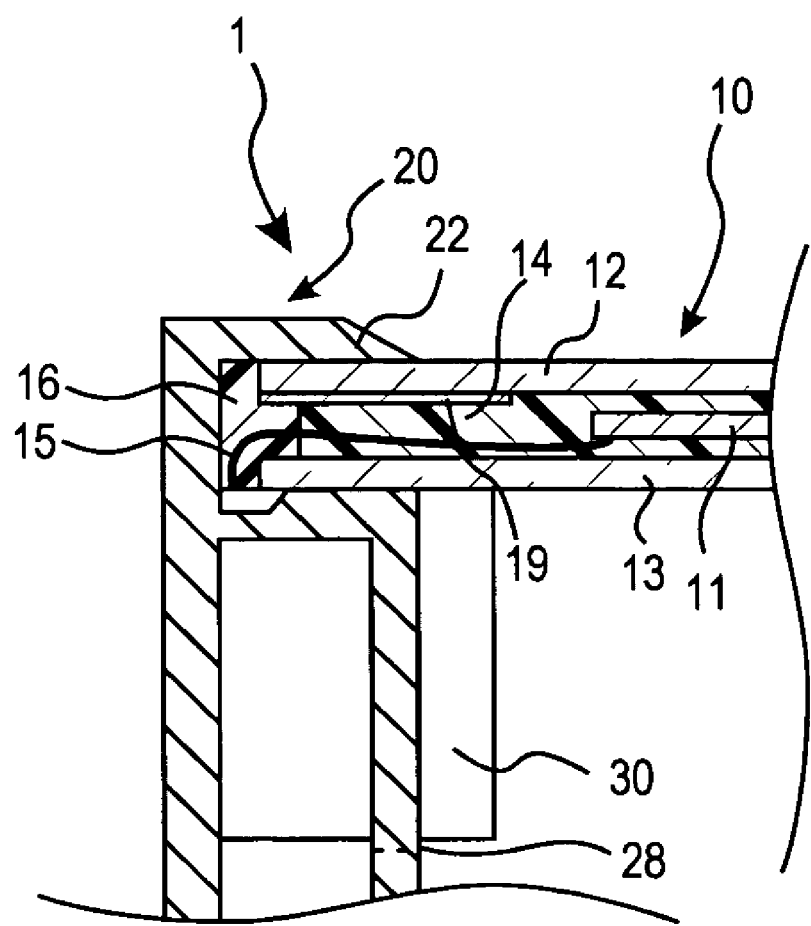
FIG. 13 is a cross-sectional view taken along the line B-B' of FIG. 1.

As illustrated in FIG. 13, the printed area 19 provided to the light-receiving side light transmitting insulative substrate 12 at a position facing toward the terminal box 30 makes the adhesive used for attaching the terminal box 30 to the rear surface side light-transmitting insulative substrate 13 invisible from the light-receiving side. The terminal box 30 is made invisible too from the light-receiving side, which keeps the good appearance of the photovoltaic module. Additionally, the printed area 19 blocks light from falling on the terminal box 30 through the light-receiving side light transmitting insulative substrate 12, which suppresses degradation of the terminal box 30. Other advantages are the same as the first embodiment.

Figure 14:
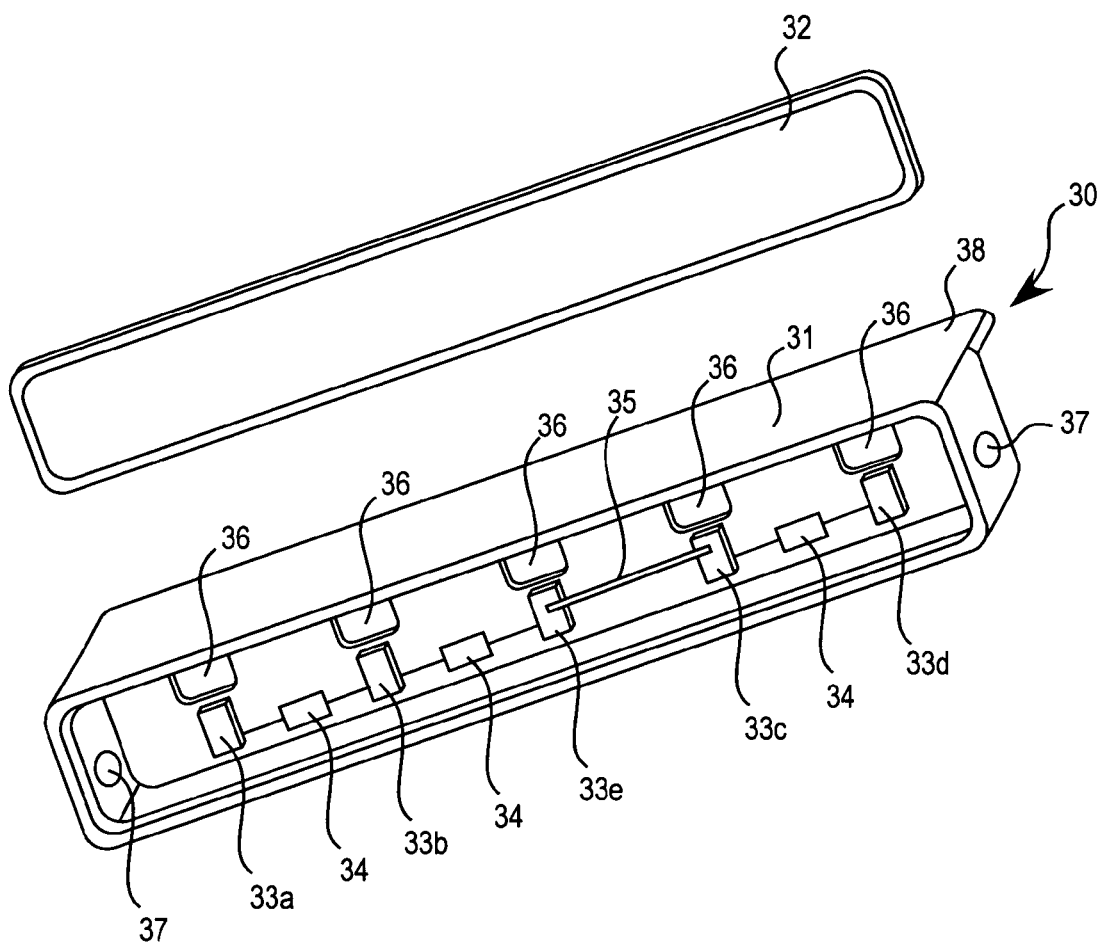
FIG. 14 is an exploded perspective view illustrating a terminal box used for a third or a fourth embodiment of the present invention.
Figure 15:
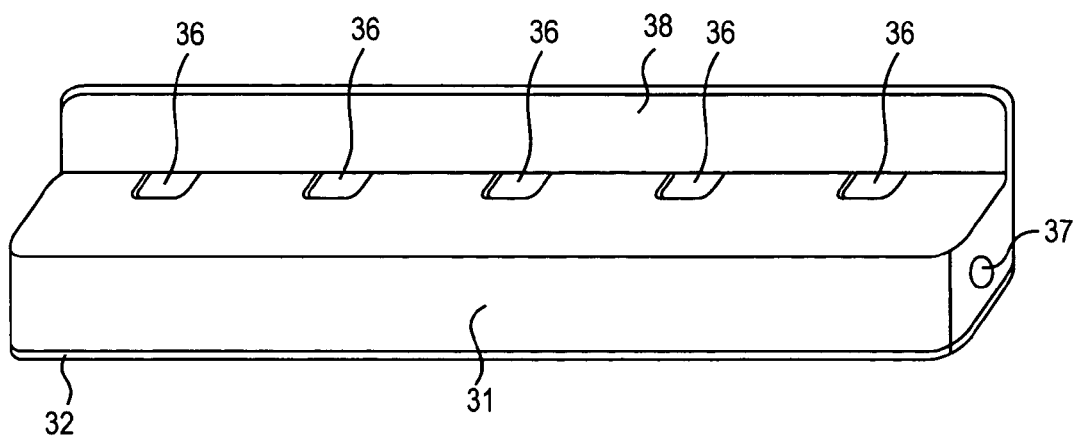
FIG. 15 is a perspective view illustrating the terminal box used for the third or the fourth embodiment of the present invention.

Next a third embodiment and a fourth embodiment of the present invention will be described. FIG. 14 and FIG. 15 show a terminal box used for the third embodiment and the fourth embodiment of the present invention. FIG. 14 is an exploded perspective view and FIG. 15 is a perspective view.

As illustrated in FIG. 13 and FIG. 14, an upright part 38 abutting on the inner wall of the fitting part 22 of the outer frame 20 is provided to the terminal box 30 formed by an insulative resin. In this example, the upright part 38 is provided continually to the main body 31. The connecting lead 15 is guided through a space between the upright part 38 and the edge of the photovoltaic submodule 10 after the outer frame 20 is set around the outer circumference of the photovoltaic submodule 10.

Figure 16:
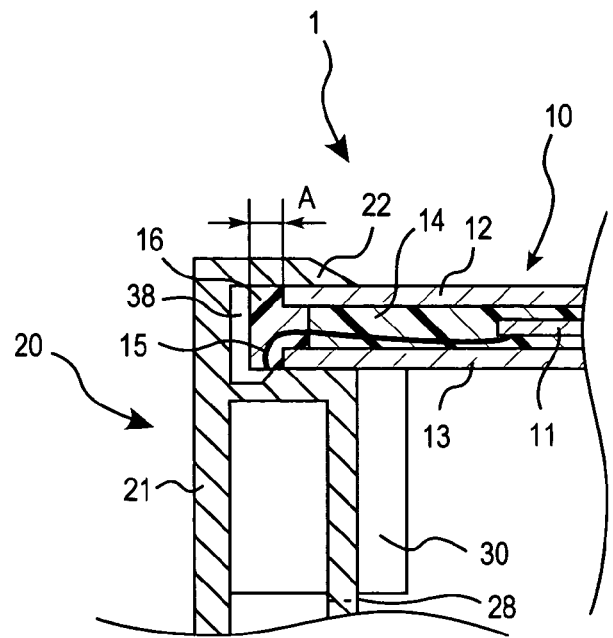
FIG. 16 is a cross-sectional view of a relevant part of a photovoltaic module according to the third embodiment of the present invention.

FIG. 16 is a cross-sectional view of a relevant part of a photovoltaic module of the third embodiment of the present invention using the above-described terminal box 30. The third embodiment uses the photovoltaic submodule 10 illustrated in FIG. 2.

As illustrated in FIG. 16, the terminal box 30 is attached near to the edge of the rear surface side light-transmitting insulative substrate 13 of the photovoltaic submodule 10. Part of the terminal box 30 is housed in the hollow of the main body 21 through the opening 28 provided to the outer frame 20. The photovoltaic submodule 10 is set in the fitting part 22 with the upright part 38 of the terminal box 30 abutting on the inner wall of the fitting part 22. In the third embodiment, the upright part 38 is formed in such a height as to reach to the inner wall which contacts with the front surface of glass 12 of the fitting part 22. The upright part 38 is located between the inner wall of the fitting part 22 and the photovoltaic submodule 10, so that the edge of the photovoltaic submodule 10 does not contact the outer frame 20 made of metal. The photovoltaic submodule 10 is set in the fitting part 22 in such a manner that a space A through which the connecting lead 15 is guided is maintained between the upright part 38 and the edge of the photovoltaic submodule 10.

As described above, the connecting lead 15 can be guided to the inside of the terminal box 30 through the space between the upright part 38 of the terminal box 30 and the edge of the photovoltaic submodule 10. As a result, the connecting lead 15 does not contact the outer frame 20 directly by the presence of the upright part 38 of the terminal box 30 made of resin, thereby securing sufficient insulation even when using the connecting lead with a thin insulating coating.

Figure 17:
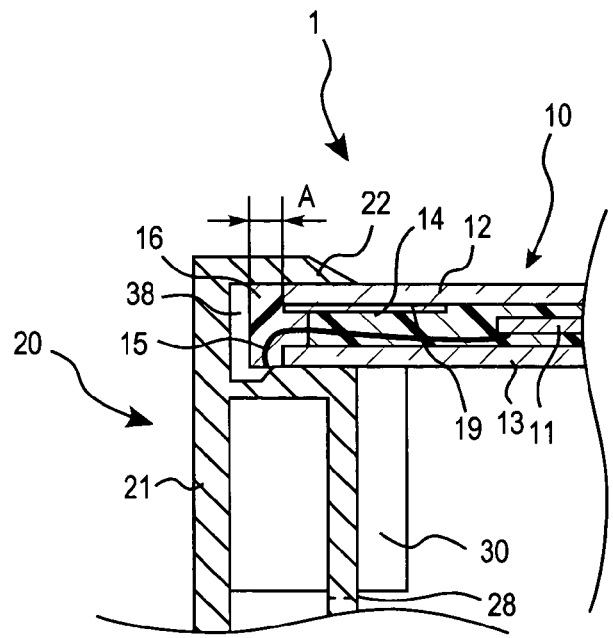
FIG. 17 is a cross-sectional view of a relevant part of a photovoltaic module according to the fourth embodiment of the present invention.

FIG. 17 is a cross-sectional view of a relevant part of a photovoltaic module according to the fourth embodiment of the present invention using the terminal box 30. The fourth embodiment uses the photovoltaic submodule 10 illustrated in FIG. 2.

As illustrated in FIG. 17, the terminal box 30 is attached near to the edge of the rear surface side light-transmitting insulative substrate 13 of the photovoltaic submodule 10. The printed area 19 is provided on the light-receiving side light-transmitting insulative substrate 12 at a position facing toward the terminal box 30. As illustrated in FIG. 17, the printed area 19 makes the adhesive used for attaching the terminal box 30 to the rear surface side light-transmitting insulative substrate 13 invisible from the light-receiving side. The terminal box 30 is made invisible too from the light-receiving side, which keeps the good appearance of the photovoltaic module.

Part of the terminal box 30 is housed in the hollow of the main body 21 through the opening 28 provided to the outer frame 20. The photovoltaic submodule 10 is set in the fitting part 22 with the upright part 38 of the terminal box 30 abutting on the inner wall of the fitting part 22. In the fourth embodiment, the upright part 38 is formed in such a height as to reach to the inner wall at the light receiving side of the fitting part 22. The upright part 38 is located between the inner wall of the fitting part 22 and the photovoltaic submodule 10, so that the edge of the photovoltaic submodule 10 does not contact the outer frame 20 made of metal. The photovoltaic submodule 10 is set in the fitting part 22 in such a manner that a space A through which the connecting lead 15 can be guided is maintained between the upright part 38 and the edge of the photovoltaic submodule 10.

As described above, the connecting lead 15 can be guided to the inside of the terminal box 30 through the space between the upright part 38 of the terminal box 30 and the edge of the photovoltaic submodule 10. As a result, the connecting lead 15 does not contact the outer frame 20 directly by the presence of the upright part 38 of the terminal box 30 made of resin, thereby securing sufficient insulation even when using the connecting lead with a thin insulating coating.

Figure 18:
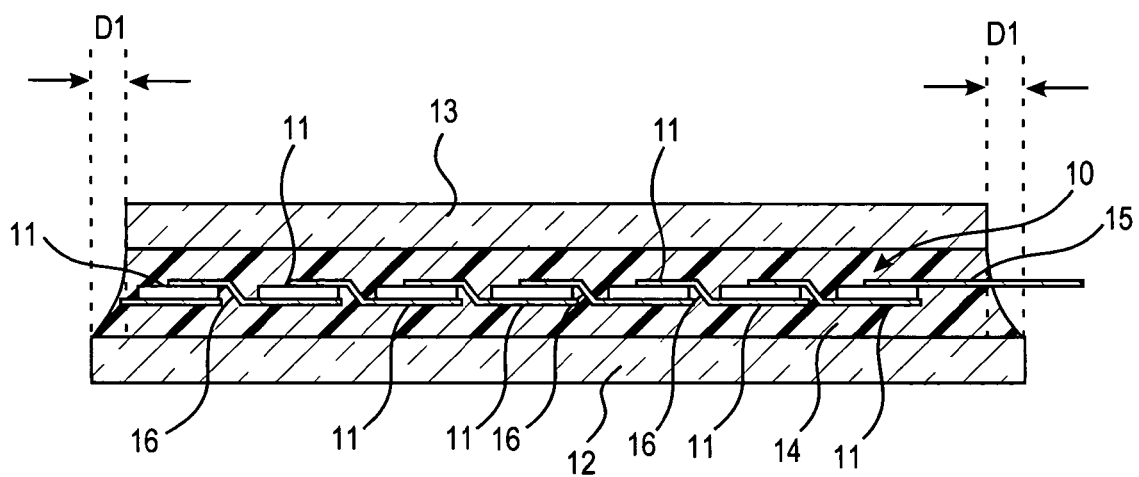
FIG. 18 is a cross-sectional view of a photovoltaic submodule used for a fifth embodiment of the present invention.
Figure 19:
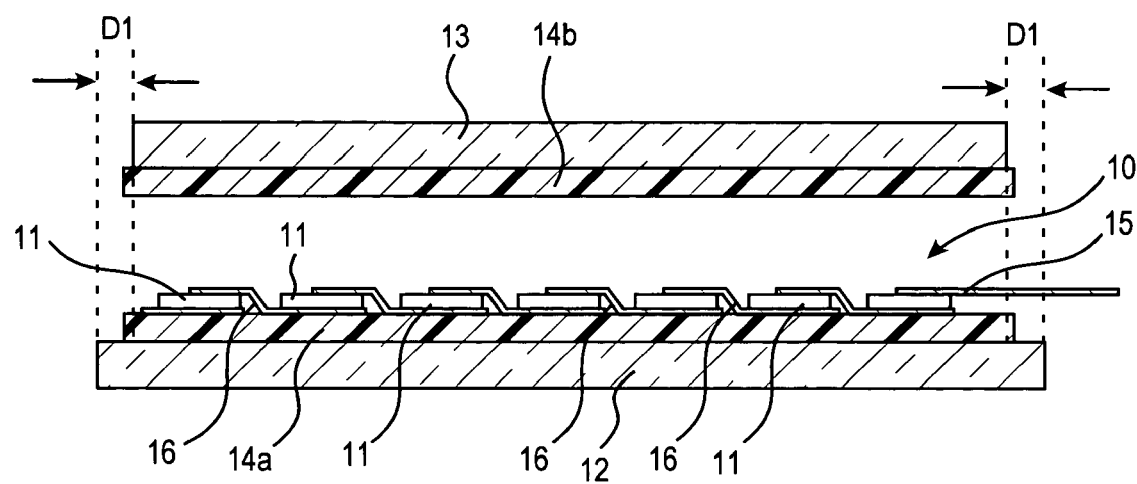
FIG. 19 is a cross-sectional view of a manufacturing example of the photovoltaic submodule used for the fifth embodiment of the present invention.
Figure 20:
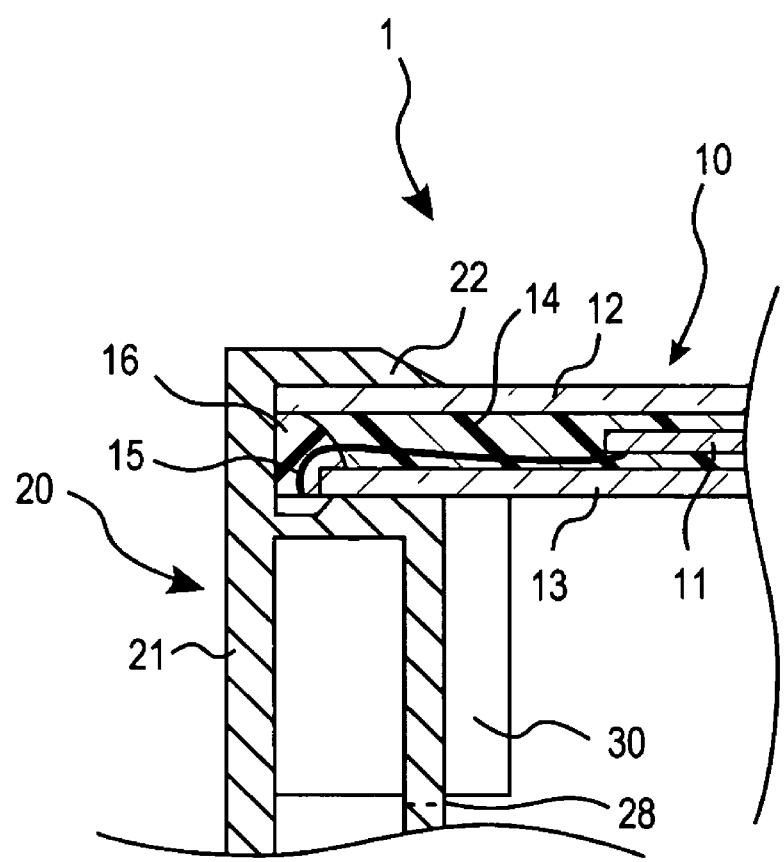
FIG. 20 is a cross-sectional view of a relevant part of the photovoltaic module according to the fifth embodiment of the present invention using the terminal box 30 shown in FIG. 10.

Next, a fifth embodiment of the present invention will be described. FIG. 18 is a cross-sectional view of a photovoltaic submodule used for a fifth embodiment of the present invention; FIG. 19 is a cross-sectional view of a manufacturing example of the photovoltaic submodule used for the fifth embodiment of the present invention; and FIG. 20 is a cross-sectional view of a relevant part of the photovoltaic module according to the fifth embodiment of the present invention using the terminal box 30 shown in FIG. 10.

In each of the first, second, third and fourth embodiments, the light-receiving side light-transmitting insulative substrate 12 and the rear surface side light-transmitting insulative substrate 13 have the same dimensions. Therefore, a space A is provided in order to guide the connecting lead 15, leading to the enlargement of the photovoltaic module by just the width of the space. The fifth embodiment is structured to minimize the space between the edge of the photovoltaic submodule 10 and the inner wall of the outer frame 20.

As designated by D1 in FIG. 18, the outer dimension of the rear surface side light-transmitting insulative substrate 13 is made smaller than that of the light-receiving side light-transmitting insulative substrate 12 in the fifth embodiment. One example is that the light-receiving side light-transmitting insulative substrate 12 is made of low iron tempered glass with an outer dimension of 796 mm×1596 mm, and the rear surface side light-transmitting insulative substrate 13 is made of low iron tempered glass with an outer dimension of 792 mm×1572 mm which is smaller than the light-receiving side light transmitting substrate. In this example, the dimensions of the wide side and the narrow side of the rear surface side light-transmitting insulative substrate 13 are approximately 98.5% and 99.5% of those of the wide side and the narrow side of the light-receiving side light-transmitting insulative substrate 12 respectively.

Another example is that the light-receiving side light-transmitting insulative substrate 12 is made of low iron tempered glass with an outer dimension of 879 mm×1332 mm, and the rear surface side light-transmitting insulative substrate 13 is made of low iron tempered glass with an outer dimension of 875 mm×1308 mm which is smaller than the light-receiving side light transmitting substrate. In this example, the dimensions of the wide side and the narrow side of the rear surface side light-transmitting insulative substrate 13 are approximately 98.2% and 99.5% of those of the wide side and the narrow side of the light-receiving side light-transmitting insulative substrate 12 respectively.

In the fifth embodiment, the dimension of the wide side of the rear surface side light-transmitting insulative substrate 13 is from 98.0% or more to 98.5% or less of that of the light-receiving side light-transmitting insulative substrate 12. The dimension of the narrow side of the rear surface side light-transmitting insulative substrate 13 is approximately 99.5% of that of the light-receiving side light-transmitting insulative substrate 12. The terminal box 30 is fixed to an edge of one of the narrow sides of the light-transmitting insulative substrate 13.

The photovoltaic submodule 10 according to the fifth embodiment is manufactured by the manufacturing equipment shown in FIG. 8 in the same way as the photovoltaic submodule 10 of the above-described first and second embodiments.

In order to manufacture the photovoltaic submodule 10, a light-receiving side light-transmitting insulative substrate 12, an EVA sheet 14a (encapsulant), a plurality of solar cells 11 connected by the inner leads 16 to each other, an EVA sheet 14b (encapsulant) and a rear surface side light-transmitting insulative substrate 13 are laminated in this order from the bottom on a heating plate 201 of the manufacturing equipment. The EVA sheets 14a and 14b are slightly smaller and larger in size than the light-receiving side light-transmitting insulative substrate 12 and the rear surface side light-transmitting insulative substrate 13 respectively. In other words, the outer dimensions of the EVA sheets 14a and 14b range from that of the light-receiving side light-transmitting insulative substrate 12 to that of the rear surface side light-transmitting insulative substrate 13. When the light-receiving side light-transmitting insulative substrate 12 is made of low iron tempered glass with an outer dimension of 796 mm×1596 mm, and the rear surface side light-transmitting insulative substrate 13 is made of low iron tempered glass with an outer dimension of 792 mm×1572 mm, the EVA sheet of 794 mm×1580 mm is used.

When the light-receiving side light-transmitting insulative substrate 12 is made of low iron tempered glass with an outer dimension of 879 mm×1332 mm, and the rear surface side light-transmitting insulative substrate 13 is made of low iron tempered glass with an outer dimension of 875 mm×1308 mm for another example, the EVA sheet of 877 mm×1320 mm is used. Additionally, the connecting lead 15 is attached to the photovoltaic submodule 10 to draw electricity generated from the solar cell 11.

As described above, the rear surface side light-transmitting insulative substrate 13 is formed in smaller dimensions than the light-receiving side light-transmitting insulative substrate 12 by 24 mm and 2 mm respectively in the wide side and the narrow side. Therefore, the rear surface side light-transmitting insulative substrate 13 is shifted by 12 mm at each of its wide sides and 1 mm at each of its narrow sides in order to be placed over the light-receiving side light-transmitting insulative substrate 12.

After the components are laminated on the heating plate 201, the lower side chamber 200 and the upper side chamber 202 are coupled. Then the lower side chamber 200 is evacuated by a vacuum pump which is not shown while the heating plate 201 is heated up to approximately 170 degrees Celsius. The diaphragm 203 is pressed against the photovoltaic submodule 10 placed on the heating plate 201 with this condition, so that the EVA sheets 14a and 14b are gelled to form the predetermined EVA layer 14. This makes the solar cell 11 interposed between the front surface side light-transmitting insulative substrate 12 and the rear surface side light-transmitting insulative substrate 13 as well as sealed within the EVA sheet 14.

Here, the dimension of the wide side of the rear surface side light-transmitting insulative substrate 13 is from 98.0% or more to 98.5% or less of that of the light-receiving side light-transmitting insulative substrate 12, and the dimension of the narrow side of the rear surface side light-transmitting insulative substrate 13 is approximately 99.5% of that of the light-receiving side light-transmitting insulative substrate 12. Shifting the rear surface side light-transmitting insulative substrate 13 by an even interval at each of its wide sides and each of its narrow sides respectively to be placed over the light-receiving side light-transmitting insulative substrate 12, the rear surface side light-transmitting insulative substrate 13 comes within the boundary of the outer dimension of the light-receiving side light-transmitting insulative substrate 12 even if the rear surface side light-transmitting insulative substrate 13 is misaligned during the above described heating and pressure bonding process.

Additionally, the light-receiving side light-transmitting insulative substrate 12 is placed at the bottom when manufacturing the photovoltaic submodule 10 by the manufacturing equipment, and components smaller than the light-receiving side light-transmitting insulative substrate 12 are placed thereon. Therefore, the rear surface side light-transmitting insulative substrate 13 is easy to be aligned. It is also possible to prevent the EVA sheets 14a and 14b from sagging.

Further, the EVA sheet warps slightly inward while it cools and hardens. In this fifth embodiment, the light-receiving side light-transmitting insulative substrate 12 and the rear surface side light-transmitting insulative substrate 13 are different in size as described above. Therefore, when the EVA sheet thus warps while it cools and hardens, an end face of the EVA sheet is formed to stretch from an end face of the rear surface side light-transmitting insulative substrate 13 and to an end face of the light-receiving side light-transmitting insulative substrate 12. This causes the EVA layer 14 of the solar cell to recede and reduce the thickness at the edge thereof, thereby preventing deterioration in sealing performance and the defective appearance of the photovoltaic submodule 10.

Additionally, the light-receiving side light-transmitting insulative substrate 12 which is larger than the rear surface side light-transmitting insulative substrate 13 is placed at the bottom during the heating process in manufacturing the photovoltaic submodule 10. This prevents EVA from sagging because the EVA remains within the boundary of the light-receiving side light-transmitting insulative substrate 12 even if the EVA sheets melt and protrude from the rear surface side light-transmitting insulative substrate 13.

The photovoltaic submodule 10 manufactured as described above is set in and fixed to the fitting part 22 of the outer frame 20 with the sealing material 16.

As described above, the dimension of the wide side of the rear surface side light-transmitting insulative substrate 13 is from 98.0% or more to 98.5% or less of that of the light-receiving side light-transmitting insulative substrate 12. As a result, a space of approximately 12 mm is made between the rear surface side light-transmitting insulative substrate 13 and the inner wall of the outer frame 20 as illustrated in FIG. 20, even when the edge of the light-receiving side light-transmitting insulative substrate 12 is adjacent to or abutting on the inner wall of the outer frame 20 to be set in the fitting part 22 of the outer frame 20 in the fifth embodiment. The connecting lead 15 is guided through the space to be inserted into the terminal box 30. Additionally, the connecting lead 15 is not interposed between the edge of the light-transmitting insulative substrate 13 and the inner wall of the outer frame 20 because of the space.

The above described structure reduces or eliminates the space for taking out the connecting lead between the outer frame 20 and the photovoltaic submodule 10, which reduces the dimensions of the photovoltaic module by just the reduced or eliminated width of the space, leading to enhancement of area efficiency in the installation area of the photovoltaic module.

Figure 21:
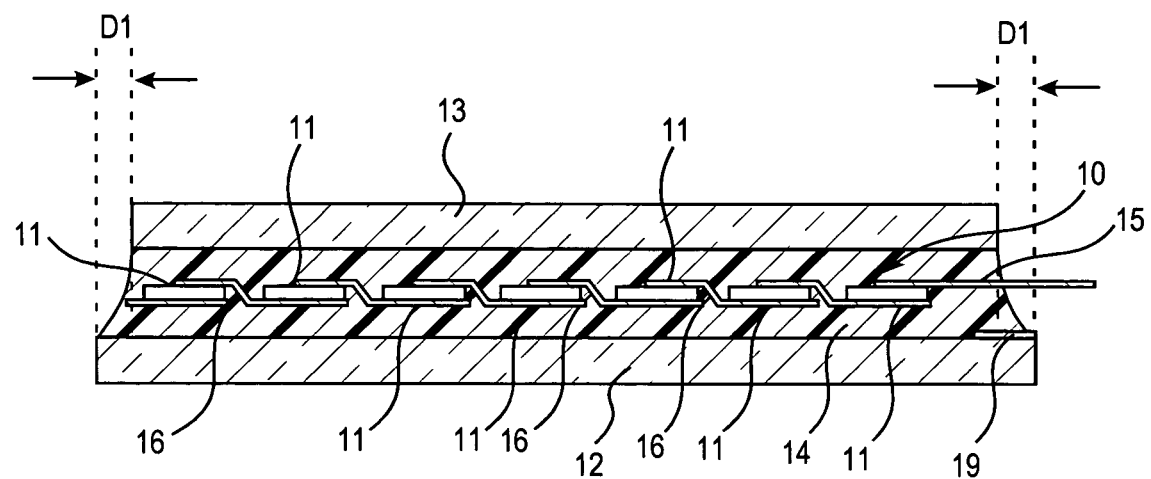
FIG. 21 is a cross-sectional view illustrating a photovoltaic submodule used for a sixth embodiment of the present invention.

Next, a sixth embodiment of the present invention will be described. FIG. 21 is a cross-sectional view illustrating a photovoltaic submodule used for a sixth embodiment of the present invention; and FIG. 22 is a cross-sectional view illustrating a relevant part of a photovoltaic module according to the sixth embodiment using the terminal box 30 illustrated in FIG. 10.

In the sixth embodiment, the terminal box 30 is fixed to an edge of one of the narrow sides of the photovoltaic module. In the sixth embodiment, a printed area 19 is provided as a masking part to the light-receiving side light-transmitting insulative substrate 12 at a position facing toward the terminal box 30. The sixth embodiment is structured in the same way as the fifth embodiment except for the printed area 19 provided to the photovoltaic submodule 10.

Figure 22:
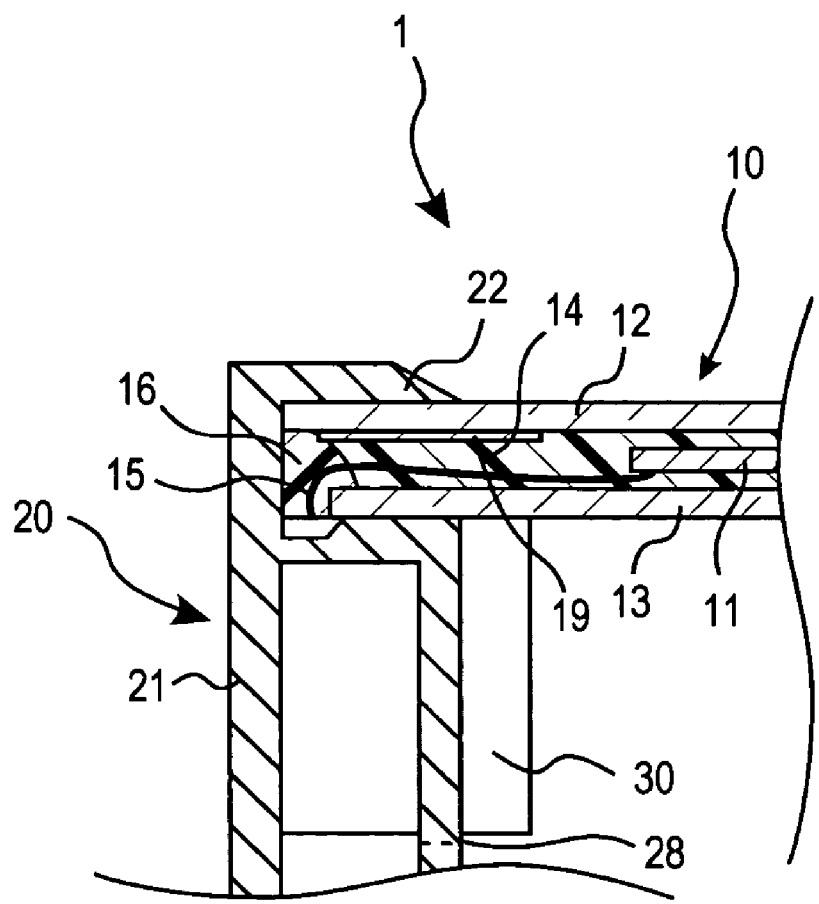
FIG. 22 is a cross-sectional view illustrating a relevant part of a photovoltaic module according to the sixth embodiment.

As illustrated in FIG. 22, the printed area 19 provided to the light-receiving side light transmitting insulative substrate 12 at a position facing toward the terminal box 30 makes the adhesive used for attaching the terminal box 30 to the rear surface side light-transmitting insulative substrate 13 invisible from the light-receiving side. The terminal box 30 is made invisible too from the light-receiving side, which keeps the good appearance of the photovoltaic module. Additionally, the printed area 19 blocks light from falling on the terminal box 30 through the light-receiving side light transmitting insulative substrate 12, which suppresses degradation of the terminal box 30. Other advantages are the same as the fifth embodiment.

Figure 23:
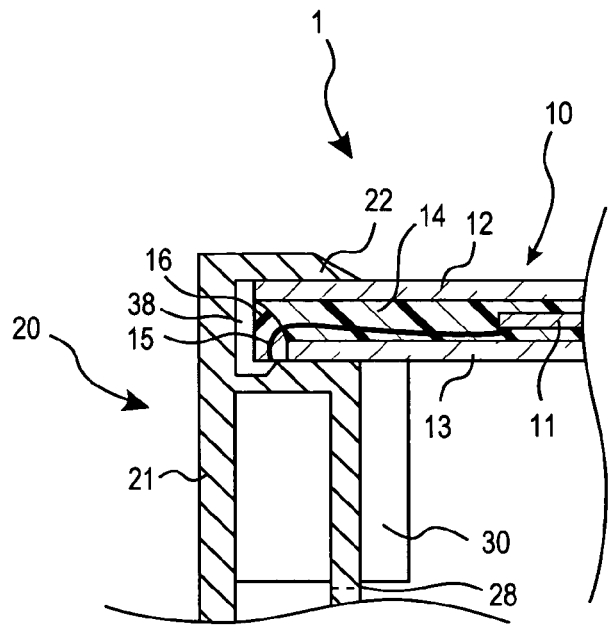
FIG. 23 is a cross-sectional view of a relevant part of a photovoltaic module according to a seventh embodiment of the present invention using the terminal box 30 shown in FIG. 14 and FIG. 15.

Next a seventh embodiment of the present invention will be described. FIG. 23 is a cross-sectional view of a relevant part of a photovoltaic module according to the seventh embodiment of the present invention using the terminal box shown in FIG. 14 and FIG. 15.

In each of the third and fourth embodiments, the light-receiving side light-transmitting insulative substrate 12 and the rear surface side light-transmitting insulative substrate 13 have the same dimensions. Therefore, a space is provided in order to guide the connecting lead 15, leading to the enlargement of the photovoltaic module by just the width of the space. The seventh embodiment is structured to minimize the space between the edge of the photovoltaic submodule 10 and the upright part 38.

The photovoltaic submodule 10 illustrated in FIG. 18 is used in the seventh embodiment. In other words, the outer dimension of the rear surface side light-transmitting insulative substrate 13 is smaller than that of the light-receiving side light-transmitting insulative substrate 12.

In the seventh embodiment, the dimension of the wide side of the rear surface side light-transmitting insulative substrate 13 is from 98.0% or more to 98.5% or less of that of the light-receiving side light-transmitting insulative substrate 12. The dimension of the narrow side of the rear surface side light-transmitting insulative substrate 13 is approximately 99.5% of that of the light-receiving side light-transmitting insulative substrate 12. The terminal box 30 is fixed to an edge of one of the narrow sides of the light-transmitting insulative substrate 13.

The photovoltaic submodule 10 illustrated in FIG. 18 is set in and fixed to the fitting part 22 of the outer frame 20 with the sealing material 16.

As described above, the dimension of the wide side of the rear surface side light-transmitting insulative substrate 13 is from 98.0% or more to 98.5% or less of that of the light-receiving side light-transmitting insulative substrate 12. As a result, a space of approximately 12 mm is made between the rear surface side light-transmitting insulative substrate 13 and the upright part 38 as illustrated in FIG. 23, even when the edge of the light-receiving side light-transmitting insulative substrate 12 is abutting on the upright part 38 of the terminal box 30 to be set in the fitting part 22 of the outer frame 20 in the seventh embodiment. The connecting lead 15 is guided through the space to be inserted into the terminal box 30. Additionally, the connecting lead 15 is not interposed between the edge of the light-transmitting insulative substrate 13 and the upright part 38 because of the space.

The above described structure eliminates the space for taking out the connecting lead between the outer frame 20 and the photovoltaic submodule 10, which reduces the dimensions of the photovoltaic module by just the eliminated width of the space, leading to enhancement of area efficiency in the installation area of the photovoltaic module.

Figure 24:
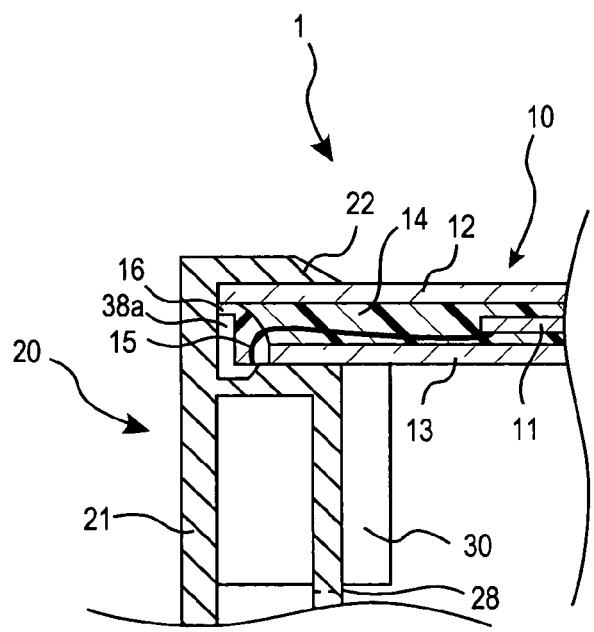
FIG. 24 is a cross-sectional view of a relevant part of a photovoltaic module according to an eighth embodiment of the present invention using the terminal box 30 shown in FIG. 14 and FIG. 15.

FIG. 24 is a cross-sectional view of a relevant part of a photovoltaic module according to an eighth embodiment of the present invention using the above-described terminal box 30 and the photovoltaic submodule 10 shown in FIG. 18. In the above-described seventh embodiment, the upright part 38 is formed in such a height as to reach to the inner wall of the light receiving side of the fitting part 22. On the other hand, an upright part 38a is formed in such a height as not to reach to the rear surface of the light-receiving side light-transmitting insulative substrate 12 but as to prevent the connecting lead 15 from contacting the inner wall of the fitting part 22 in the eighth embodiment. The edge of the light-receiving side light-transmitting insulative substrate 12 is abutting on the inner wall at the side surface of the outer frame 20 to be set in the fitting part 22 of the outer frame 20. A space is made between the rear surface side light-transmitting insulative substrate 13 and the upright part 38a in the eighth embodiment, too. The connecting lead 15 is guided through the space to be inserted into the terminal box 30. The connecting lead 15 is not interposed between the edge of the light-transmitting insulative substrate 13 and the upright part 38a because of the space, in the same way as the fifth embodiment.

With the above-described structure, a space through which the connecting lead is taken out is not needed between the outer frame 20 and the photovoltaic submodule 10 as well as the light-transmitting insulative substrate 12 can be abutting directly on the inner wall of the fitting part 22. This further reduces the dimensions of the photovoltaic module and improves the rate of area which contributes to produce electricity in the installation area of the photovoltaic module. Additionally, the upright part 38a can be made small, which makes the process of inserting the terminal box 30 into the opening 28 easier as well as reduces the material cost.

Although, a space is made between the upright part 38a and the light-transmitting insulative substrate 12 in the eighth embodiment illustrated in FIG. 24, the upright part 38a can also be formed in such a height that the tip thereof contacts the light-transmitting insulative substrate 12.

The photovoltaic submodule 10 can be attached to the outer frame 20 accurately if the edge of the light-transmitting insulative substrate 12 abuts on the upright part 38 or on the inner wall at the side surface of the fitting part 22 as in the seventh or eighth embodiment. Additionally, the upright part 38 or 38a may be provided only in the vicinity of where the connecting lead 15 is guided through in the seventh or eighth embodiment.

Further in the above described embodiments, an outer dimension of the rear surface side light-transmitting insulative substrate 13 is smaller than that of the front surface side light-transmitting insulative substrate 12 so that a space is secured for the connecting lead 15 not to be interposed between the edge of the light-transmitting insulative substrate 13 and the upright part 38 or 38a. On the other hand, two substrates of the same size can also be used. The space through which the connecting lead 15 is guided is secured by shifting the light-transmitting insulative substrate 12 and the light-transmitting insulative substrate 13 so that the light-transmitting insulative substrate 12 protrudes over the light-transmitting insulative substrate 13 toward the outside at the side from where the connecting lead 15 is taken out.

Additionally, the outer dimension of the rear surface side light-transmitting insulative substrate 13 can be made smaller than that of the front surface side light-transmitting insulative substrate 12 in the above-described first embodiment, so that a space is secured for the connecting lead 15 not to be interposed between the edge of the light-transmitting insulative substrate 13 and the upright part 38 or 38a. Alternatively, a photovoltaic submodule 10 can be used in which two substrates of the same size are used by shifting the light-transmitting insulative substrate 12 and the light-transmitting insulative substrate 13 so that the light-transmitting insulative substrate 12 protrudes over the light-transmitting insulative substrate 13 toward the outside at the side from where the connecting lead 15 is taken out. By using such a photovoltaic submodule 10, a sufficient space through which the connecting lead 15 is guided is secured between the inner wall at the side surface of the fitting part 22 and the light-transmitting insulative substrate 13 when the photovoltaic submodule 10 is set in the outer frame 20.

Figure 25:
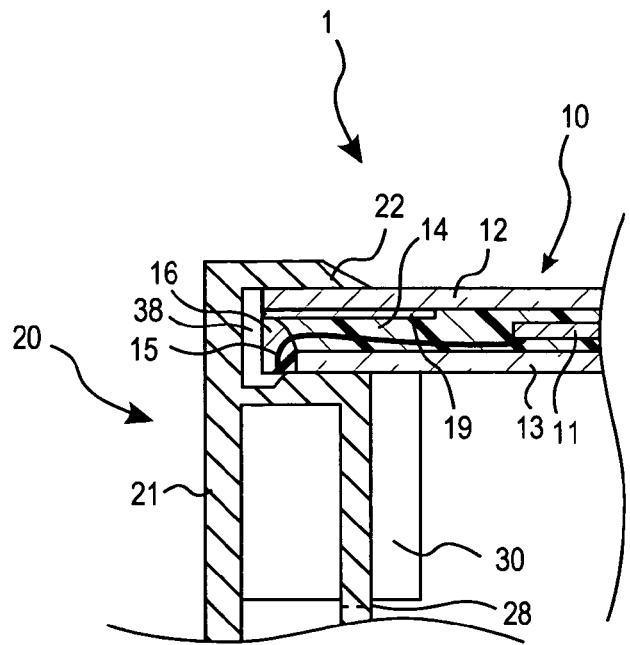
FIG. 25 is a cross-sectional view of a relevant part of a photovoltaic module according to a ninth embodiment of the present invention using the terminal box 30 shown in FIG. 14 and FIG. 15.
Figure 26:
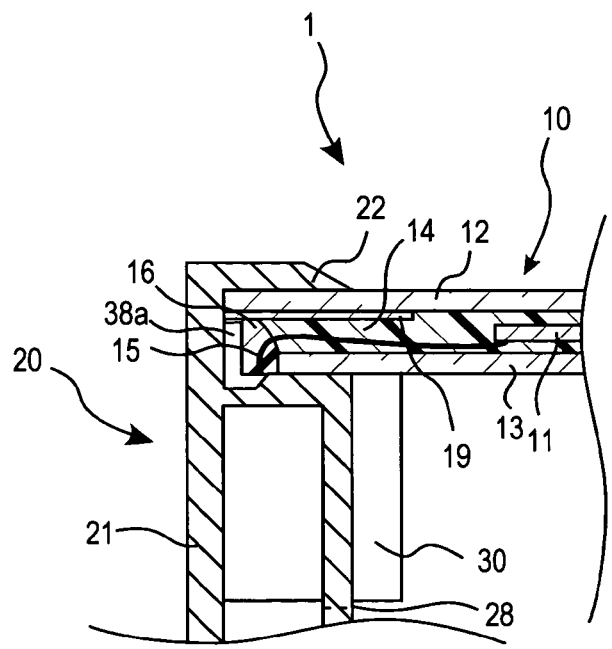
FIG. 26 is a cross-sectional view of a relevant part of a photovoltaic module according to a tenth embodiment of the present invention using the terminal box 30 shown in FIG. 14 and FIG. 15.
Figure 27:
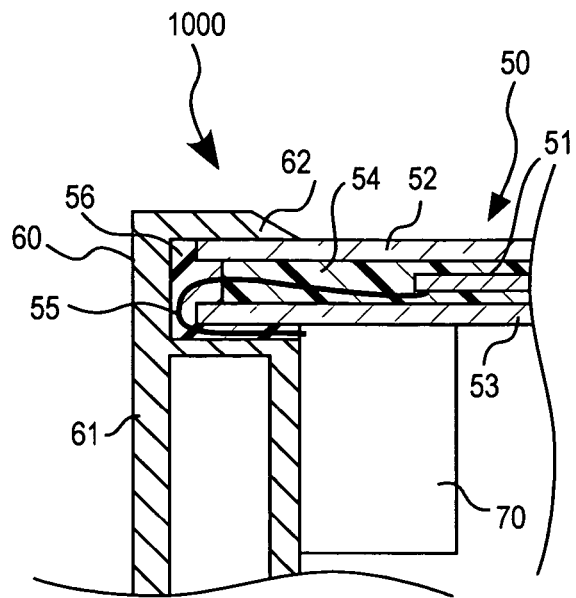
FIG. 27 is a cross-sectional view of a relevant part of a conventional photovoltaic module.
Figure 28:
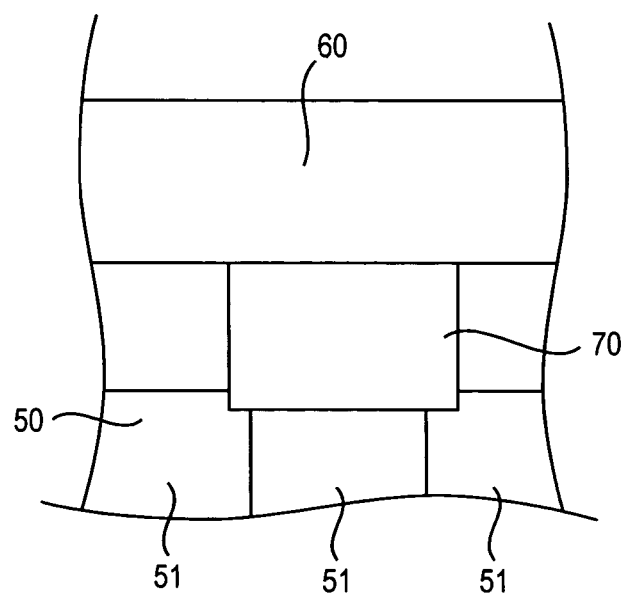
FIG. 28 is a plan view of a relevant part of a conventional photovoltaic module.

Next, a ninth and a tenth embodiments of the present invention will be described. FIG. 25 is a cross-sectional view of a relevant part of a photovoltaic module according to the ninth embodiment of the present invention using the terminal box 30 shown in FIG. 14 and FIG. 15; and FIG. 26 is a cross-sectional view of a relevant part of a photovoltaic module according to the tenth embodiment of the present invention using the terminal box 30 shown in FIG. 14 and FIG. 15. In the ninth and the tenth embodiments, the photovoltaic submodule 10 illustrated in FIG. 21 is used.

In the ninth embodiment, the terminal box 30 is fixed to an edge of one of the narrow sides of the photovoltaic module. In the ninth embodiment, the photovoltaic submodule 10 is used which includes a printed area 19 provided to the light-receiving side light-transmitting insulative substrate 12 at a position facing toward the terminal box 30 as illustrated in FIG. 21. The ninth embodiment is structured in the same way as the seventh embodiment except for the printed area 19 provided to the photovoltaic submodule 10.

As illustrated in FIG. 25, the printed area 19 provided to the light-receiving side light transmitting insulative substrate 12 at a position facing toward the terminal box 30 makes the adhesive used for attaching the terminal box 30 to the rear surface side light-transmitting insulative substrate 13 invisible from the light-receiving side. The terminal box 30 is made invisible too from the light-receiving side, which keeps the good appearance of the photovoltaic module. Additionally, the printed area 19 blocks light from falling on the terminal box 30 through the light-receiving side light transmitting insulative substrate 12, which suppresses degradation of the terminal box 30. Other advantages are the same as the seventh embodiment.

In the tenth embodiment, the terminal box 30 is fixed to an edge of one of the narrow sides of the photovoltaic module. The photovoltaic submodule 10 illustrated in FIG. 21 is used for the tenth embodiment. In other words, a printed area 19 is provided to the light-receiving side light-transmitting insulative substrate 12 at a position facing toward the terminal box 30. The tenth embodiment is structured in the same way as the eighth embodiment except for the printed area 19 provided to the photovoltaic submodule 10.

As illustrated in FIG. 26, the printed area 19 provided to the light-receiving side light transmitting insulative substrate 12 at a position facing toward the terminal box 30 makes the adhesive used for attaching the terminal box 30 to the rear surface side light-transmitting insulative substrate 13 invisible from the light-receiving side. The terminal box 30 is made invisible too from the light-receiving side, which keeps the good appearance of the photovoltaic module. Additionally, the printed area 19 blocks light from falling on the terminal box 30 through the light-receiving side light-transmitting insulative substrate 12, which suppresses degradation of the terminal box 30. Other advantages are the same as the eighth embodiment.

Although the rear surface side substrate is a light-transmitting insulative substrate 13 in the above-described embodiments, the present invention is applicable to a photovoltaic module using a rear surface side insulative member which does not transmit light. Additionally, rigid plastic or the like may be used as the light-transmitting insulative substrate although low iron tempered glass is used in the above-described embodiments. Further, the rear surface side light-transmitting insulative substrate 13 may be an insulative film which does not transmit water.

It should be understood that the embodiments disclosed herein are to be taken as examples and not limited. The scope of the present invention is defined not by the above described embodiments but by the following claims. All changes that fall within means and bounds of the claims, or equivalence of such means and bounds are intended to embraced by the claims.

What we claim is:

1. A photovoltaic module comprising:
a photovoltaic submodule including a plurality of solar cells interposed between a light-transmitting first member and a second member through the intermediary of an encapsulant,
a connecting lead extending from an edge between the light-transmitting first member and the second member for outputting generated electric current;
a terminal box disposed at an edge of the photovoltaic submodule and housing a connecting part between the connecting lead and a cable for outputting generated electric current to the outside, the terminal box disposed at an ineffective part of the photovoltaic submodule which does not contribute to power generation; and
an outer frame disposed about an outer circumference of the photovoltaic submodule,
wherein the outer frame includes a fitting part and a lateral main body, the fitting part receiving and pinching the outer circumference of the photovoltaic submodule, the lateral main body including an opening for receiving the terminal box therein and
wherein the connecting lead extends from the edge of the outer circumference of the photovoltaic submodule, is inserted into the fitting part of the outer frame, and is received in the terminal box.

2. The photovoltaic module according to claim 1, wherein a masking part is provided to the first member at a position facing toward the terminal box.

3. The photovoltaic module according to claim 1, wherein the second member is made of a light-transmitting material, and the photovoltaic submodule is double-sided light receiving type.

4. A photovoltaic module comprising:
a photovoltaic submodule including a plurality of solar cells interposed between a light-transmitting first member and a second member through the intermediary of an encapsulant,
a connecting lead extending from an edge between the light-transmitting first member and the second member for outputting generated electric current;
a terminal box disposed at an edge of the photovoltaic submodule and affixed to the second member and housing a connecting part between the connecting lead and a cable for outputting generated electric current to the outside, the terminal box disposed at an ineffective part of the photovoltaic submodule which does not contribute to power generation; and
an outer frame extending about a perimeter of the photovoltaic submodule,
wherein the outer frame includes a fitting part and a lateral main body, the fitting part receiving and pinching the outer perimeter of the photovoltaic module, the lateral main body including an opening for receiving the terminal box therein, wherein
an opening into which the terminal box is inserted is provided at the lateral main body of the outer frame,
the second member is disposed so that the first member protrudes over the second member toward the outside on a side from where the connecting lead is extended out, and
the connecting lead is guided on the second member side through a space between the second member and the fitting part to be introduced into the terminal box inserted into the opening.

5. The photovoltaic module according to claim 4, wherein an outer dimension of the second member is smaller than an outer dimension of the first member.

6. The photovoltaic module according to claim 4, wherein the terminal box is attached to a narrow side of the photovoltaic submodule, and a dimension of a wide side of the second member is from 98.0% or more to 98.5% or less of that of the first member.

7. The photovoltaic module according to claim 4, wherein the encapsulant is formed by a sheet which is smaller than the first member and larger than the second member.

8. The photovoltaic module according to claim 4, wherein a masking part is provided to the first member at a position facing toward the terminal box.

9. The photovoltaic module according to claim 4, wherein the second member is made of a light-transmitting material, and the photovoltaic submodule is double-sided light receiving type.

10. A photovoltaic module comprising:
a photovoltaic submodule including a plurality of solar cells interposed between a light-transmitting first member and a second member through the intermediary of an encapsulant,
a connecting lead extending from an edge between the light-transmitting first member and the second member for outputting generated electric current;
an outer frame having a fitting part disposed about an outer circumference of the photovoltaic submodule
a terminal box made of resin disposed at an edge of the photovoltaic submodule and attached to the second member and housing a connecting part between the connecting lead and a cable for outputting generated electric current to the outside and provided with an upright part which rises on the first member side abutting on an inner wall of the fitting part, the terminal box being disposed at an ineffective part of the photovoltaic submodule which does not contribute to power generation; and
an opening into which the terminal box is inserted is provided at the outer frame, and
wherein the connecting lead is guided through a space between the upright part which rises on the first member side of the terminal box and an edge of the photovoltaic submodule to be introduced into the terminal box.

11. The photovoltaic module according to claim 10, wherein a masking part is provided to the first member at a position facing toward the terminal box.

12. The photovoltaic module according to claim 10, wherein
the second member is disposed so that the first member protrudes over the second member toward the outside on a side from where the connecting lead is extended out,
an edge of the first member abuts on the upright part of the terminal box, and
the connecting lead is guided through a space between the second member and the upright part.

13. The photovoltaic module according to claim 10, wherein an outer dimension of the second member is smaller than an outer dimension of the first member.

14. The photovoltaic module according to claim 10, wherein the terminal box is attached to a narrow side of the photovoltaic submodule, and a dimension of a wide side of the second member is from 98.0% or more to 98.5% or less of that of a dimension of the first member.

15. The photovoltaic module according to claim 10, wherein the encapsulant is formed by a sheet which is smaller than the first member and larger than the second member.

16. The photovoltaic module according to claim 10, wherein the second member is disposed so that the first member protrudes over the second member toward the outside on a side from where the connecting lead is extended out, an edge of the first member is positioned near to an inner wall at a side surface of the fitting part, and the connecting lead is guided through a space between the second member and the upright part.

17. The photovoltaic module according to claim 10, wherein the second member is disposed so that the first member protrudes over the second member toward the outside on a side from where the connecting lead is extended out, an edge of the first member abuts on an inner wall at a side surface of the fitting part, and the connecting lead is guided through a space between the second member and the upright part.

18. The photovoltaic module according to claim 17, wherein an outer dimension of the second member is smaller than an outer dimension of the first member.

19. The photovoltaic module according to claim 17, wherein the encapsulant is formed by a sheet which is smaller than the first member and larger than the second member.

20. The photovoltaic module according to claim 10, wherein the second member is made of a light-transmitting material, and the photovoltaic submodule is double-sided light receiving type.

\* \* \* \* \*